United States Patent
Burton et al.

(10) Patent No.: US 7,181,541 B1
(45) Date of Patent: Feb. 20, 2007

(54) HOST-FABRIC ADAPTER HAVING HARDWARE ASSIST ARCHITECTURE AND METHOD OF CONNECTING A HOST SYSTEM TO A CHANNEL-BASED SWITCHED FABRIC IN A DATA NETWORK

(75) Inventors: Tom E. Burton, Beaverton, OR (US); Dominic J. Gasbarro, Forest Grove, OR (US); Brian M. Leitner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 09/672,711

(22) Filed: Sep. 29, 2000

(51) Int. Cl.
*G06F 15/16* (2006.01)
*G06F 15/76* (2006.01)
*G06F 13/14* (2006.01)
*H04L 12/66* (2006.01)

(52) U.S. Cl. .......................... 709/250; 712/34; 712/36; 710/305; 370/463

(58) Field of Classification Search ................ 709/250; 712/36, 34; 710/305, 310, 311; 370/463
See application file for complete search history.

(56) References Cited

U.S. PATENT DOCUMENTS

| | | | |
|---|---|---|---|
| 5,367,643 A | | 11/1994 | Chang et al. |
| 5,634,015 A | * | 5/1997 | Chang et al. ................ 710/310 |
| 6,188,690 B1 | * | 2/2001 | Holden et al. ............... 370/390 |
| 6,243,787 B1 | | 6/2001 | Kagan et al. |
| 6,400,730 B1 | | 6/2002 | Latif et al. |
| 6,421,711 B1 | | 7/2002 | Blumenau et al. |
| 6,545,981 B1 | | 4/2003 | Garcia et al. |
| 6,557,060 B1 | | 4/2003 | Haren |
| 6,591,310 B1 | | 7/2003 | Johnson |
| 6,594,701 B1 | | 7/2003 | Forin |
| 6,611,879 B1 | | 8/2003 | Dobecki |

(Continued)

OTHER PUBLICATIONS

Cole et al. High Speed Transceviers: A Challenge for Manufactoring, 1999 pp. 211-215.*

(Continued)

*Primary Examiner*—Larry D. Donaghue
(74) *Attorney, Agent, or Firm*—Schwegman, Lundberg, Woessner & Kluth, P.A.

(57) ABSTRACT

A host system is provided with one or more host-fabric adapters installed therein for connecting to a switched fabric of a data network. The host-fabric adapter may comprise a Micro-Engine (ME) arranged to establish connections and support data transfers via a switched fabric; a host interface arranged to receive and transmit host data transfer requests, in the form of descriptors, from the host system for data transfers, and incorporated therein a host interface Hardware Assist (HWA) mechanism configured to pre-process host descriptors for descriptor format errors in parallel with descriptor fetches so as to offload the Micro-Engine (ME) from exclusively checking for descriptor format errors; a serial interface arranged to receive and transmit data packets from the switched fabric for data transfers; and a first-in/first-out (FIFO) interface arranged to receive and transmit data packets to/from the switched fabric via the serial interface, and incorporated therein a Protection Index and Offset Hardware Assist (HWA) mechanism configured to process the Virtual Address (VA) and Memory Handle (MH) of data packets and generate therefrom a Protection Index (PI) and Offset so as to offload said Micro-Engine (ME) from exclusively processing data packets for data transfers.

36 Claims, 15 Drawing Sheets

U.S. PATENT DOCUMENTS

| | | | |
|---|---|---|---|
| 6,628,609 B2 | 9/2003 | Chapman et al. | |
| 6,668,299 B1 | 12/2003 | Kagan et al. | |
| 6,678,782 B1 | 1/2004 | Aydemir et al. | |
| 6,690,757 B1 | 2/2004 | Bunton et al. | |
| 6,691,198 B1 | 2/2004 | Hamlin | |
| 6,694,392 B1 * | 2/2004 | Haren | 710/65 |
| 6,751,238 B1 * | 6/2004 | Lipp et al. | 370/541 |
| 6,775,719 B1 * | 8/2004 | Leitner et al. | 710/33 |
| 6,778,548 B1 | 8/2004 | Burton et al. | |
| 6,831,916 B1 * | 12/2004 | Parthasarathy et al. | 370/359 |
| 6,859,867 B1 * | 2/2005 | Berry | 711/206 |
| 6,889,380 B1 * | 5/2005 | Shah | 719/327 |
| 6,937,611 B1 | 8/2005 | Ward | |
| 2001/0053148 A1 | 12/2001 | Billic et al. | |
| 2002/0071450 A1 | 6/2002 | Gasbarro et al. | |
| 2003/0070014 A1 | 4/2003 | Haren | |
| 2003/0091037 A1 | 5/2003 | Latif et al. | |

OTHER PUBLICATIONS

Torres et al. A New Bus Assignment in a Designed Shaed Bus Switch Fabric 1999 pp. 423-426.*

U.S. Appl. No. 09/671,707, filed Sep. 28, 2000.

U.S. Appl. No. 09/731,746, filed Dec. 8, 2000.

U.S. Appl. No. 09/698,166, filed Oct. 30, 2000.

U.S. Appl. No. 09/698,188, filed Oct. 30, 2000.

U.S. Appl. No. 09/672,711, filed Sep. 29, 2000.

U.S. Appl. No. 09/671,703, filed Sep. 28, 2000.

U.S. Appl. No. 09/669,670, filed Sep. 26, 2000.

"Next Generation I/O Link Architecture Specification: HCA Specification", *NGIO Forum*, Release 1.0.0,(Jul. 20, 1999), 1-58.

"Virtual Interface Architecture Specification", *Draft Revision 1.0*, (Dec. 4, 1997), 1-83.

"InfiBand(TM) Architecture Specification", *Infiband Trade Association*, vol. 1, Release 1.0, InfiBand Trade Association,(Oct. 24, 2000), 1-880.

"InfiBand(TM) Architecture Specification", *Infiband Trade Association*, vol. 2, Release 1.0, InfiBand Trade Association,(Oct. 24, 2000), 1-623.

Begel, A., et al., "An Analysis of VI Architecture Primitives in Support of Parallel and Distributed Communication", *Concurrency and Computation: Practice and Experience, 14(1)*, (2001), 1-16.

Buonadonna, P., et al., "An Implementation and Analysis of the Virtual Interface Architecture", *IEEE/ACM Conference on Supercomputing, SC98*, (1998), 1-19.

Dunning, D., et al., "The Virtual Interface Architecture", *IEEE Micro, 18(2)*, (1998),66-76.

Garcia, D., et al., "Future I/O", *The 6th International Conference on Parallel Interconnects, 1999. (PI '99) Proceedings.*, (Oct. 1999), 1-5.

Mahon, M. J., et al., "Hewlett-Packard Precision Architecture: The Processor", *Hewlett-Packard Journal*, (Aug. 1986),4-22.

Patel, N., et al., "A model of completion queue mechanisms using the virtual interface API", *IEEE International Conference on Cluster Computing, 2000. Proceedings.*, (2000),280-288.

* cited by examiner

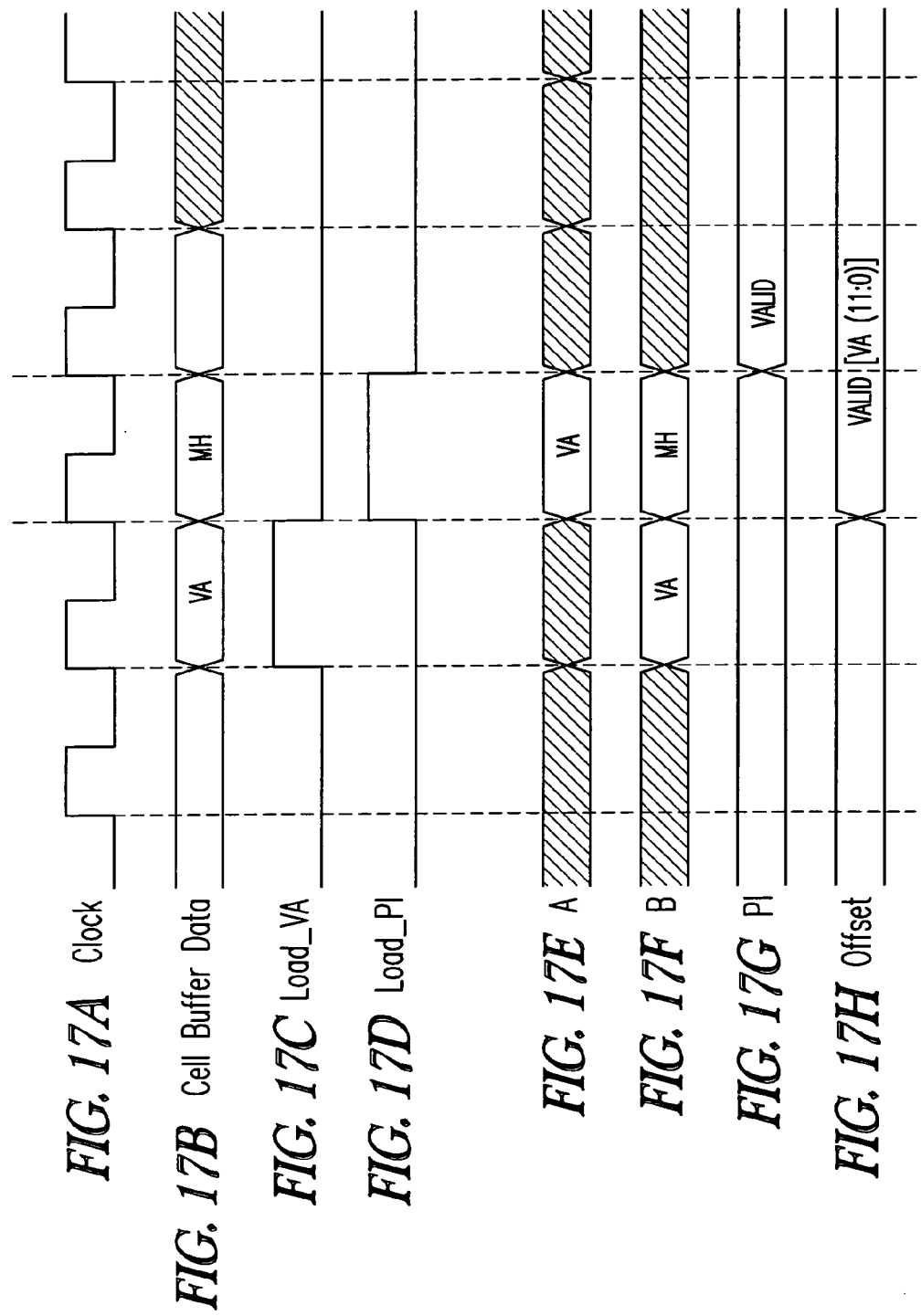

HOST-FABRIC ADAPTER HAVING HARDWARE ASSIST ARCHITECTURE AND METHOD OF CONNECTING A HOST SYSTEM TO A CHANNEL-BASED SWITCHED FABRIC IN A DATA NETWORK

TECHNICAL FIELD

The present invention relates to a data network, and more particularly, relates to a host-fabric adapter having hardware assist architecture and a method of connecting a host system to a channel-based switched fabric in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "*PCI Local Bus Specification, Revision* 2.1" set forth by the PCI Special Interest Group (SIG) on Jun. 1, 1995, may be utilized to deliver message data to and from I/O devices, namely storage subsystems and network devices via a data network. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation to provide a standards-based I/O platform that uses a switched fabric and separate I/O channels instead of a shared memory-mapped bus architecture for reliable data transfers between end-nodes in a data network, as set forth in the "*Next Generation Input/Output (NGIO) Specification,*" NGIO Forum on Jul. 20, 1999 and the "*InfiniBand™ Architecture Specfication,*" the InfiniBand™ Trade Association scheduled for publication in late October 2000. Using NGIO/InfiniBand™, a host system may communicate with one or more remote systems using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as send/receive operations and remote direct memory access "RDMA" read/write operations) may be posted to work queues associated with a given network interface card. One or more channels between communication devices at host systems via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card for a host system to connect to a data network using a channel-based, switched fabric architecture to support data movement operations between communication devices at a host system or between host systems or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter having hardware assist architecture installed at a host system in a data network using a channel-based, switched fabric architecture, and optimized for NGIO/InfiniBand™ functioality, including controlling execution of NGIO/InfiniBand™ protocols with minimal pipelining and NGIO/InfiniBand™ data cell/packet processing with minimal latency.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIGS. 17A–17H illustrate an example timing diagram of the Protection Index and Offset generation according to an embodiment of the present invention.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
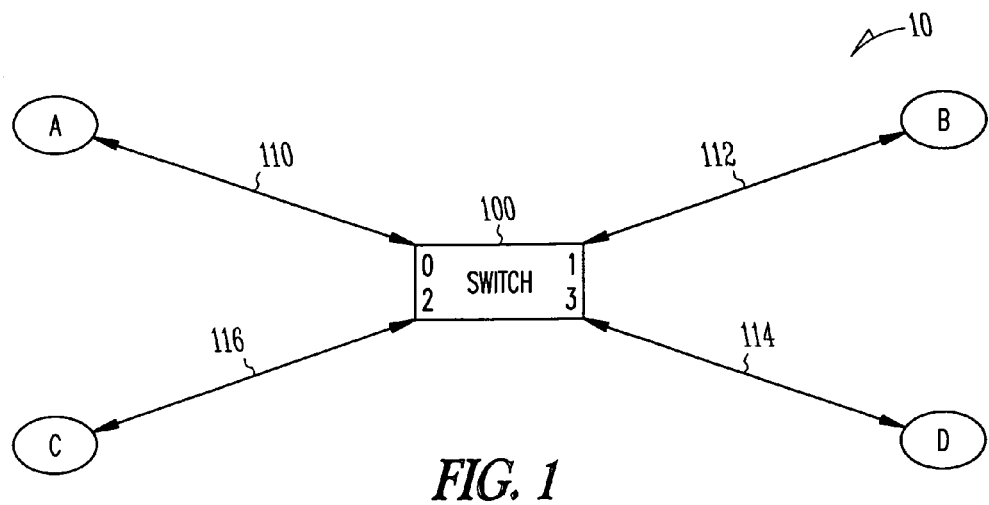
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (10C) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association scheduled for publication in late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand™ Specification* for enabling the endpoints (nodes) to communicate to each other over an NGIO/InfiniBand™ channel(s).

Figure 2:
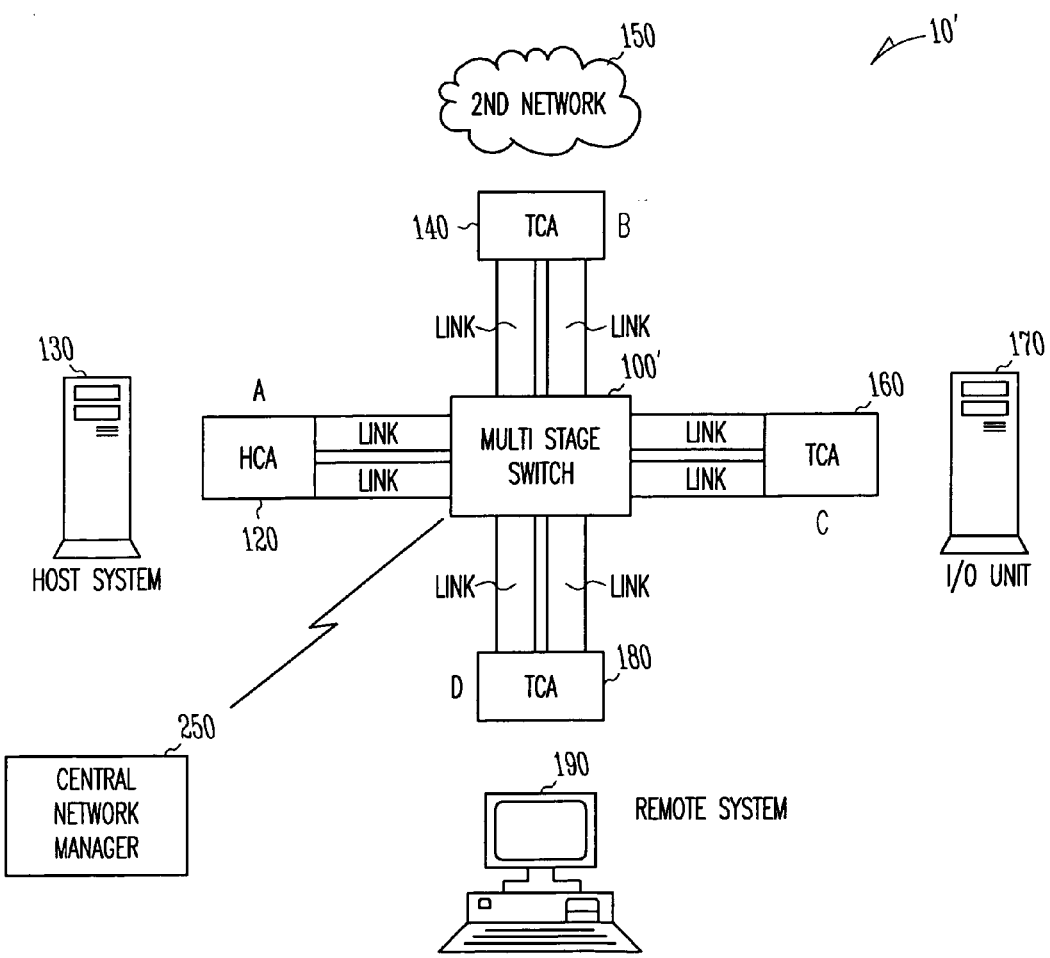
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and I/O units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided.

Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "*Next Generation I/O Link Architecture Specification: HCA Specification, Revision 1.0*" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBand-ta.org."

Figure 3:
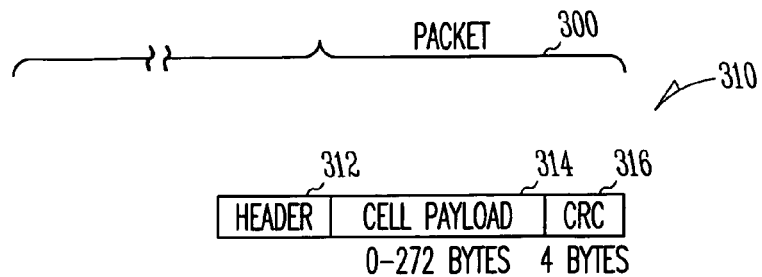
FIG. 3 illustrates packet and cell formats of data transmitted from a source node to a destination node in an example data network according to an embodiment of the present invention.

FIG. 3 illustrates an embodiment of packet and cell formats of message data transmitted from a source node (data transmitter) to a destination node (data receiver) through switches and/or intermediate nodes according to the "*Next Generation I/O Link Architecture Specification*" as set forth by the NGIO Forum on Mar. 26, 1999. As shown in FIG. 3, a data packet 300 may represent a sequence of one or more data cells 310. Each cell 310 may include a fixed format header information 312, a variable format cell payload 314 and a cyclic redundancy check (CRC) information 316. Under the "*InfiniBand™ Architecture Specification*" as set forth by the InfiniBand™ Trade Association, the same data cells may be referred to as data packets having similar header information as the least common denominator (LCD) of message data. Therefore, for purposes of this disclosure, data cells and data packets may be interchangeable via NGIO/InfiniBand™ protocols.

The header information 312 may consist of media control access information which specifies cell formation, format and validation and different types of headers, for example, routing header and transport header. Transport header may be extended to include additional transport fields, such as Virtual Address (VA) (not shown) and Memory Handle (MH) (not shown) for remote direct memory access (RDMA) operations (e.g., read and write operations). Rather than physical addresses, Virtual Address (VA) and Memory Handle (MH) are employed not only by data packets but also by NGIO/InfiniBand™ descriptors to address host memory 206 of the host system 130.

Each cell payload may provide appropriate packet fields and up to 256 bytes of data payload. The cell CRC may consist of 4-bytes of checksum for all of the data in the cell. Accordingly, the maximum size cell as defined by NGIO specification may be, but not limited to, 292 bytes (256-byte Data Payload, 16-byte Header, 16-Byte Virtual Address/ Immediate data, and 4-byte CRC). Under the InfiniBand™ specification, the maximum packet size may be larger than the maximum cell size as described with reference to FIG. 3.

Signaling protocols for NGIO/InfiniBand™ links may contain code groups for signaling the beginning and end of a cell and for the gap between cells, and code groups for controlling the flow of cells across the link. For example, Start of Cell (SOC) and End of Cell (EOC) delimiters, inter-cell flow control sequences (Comma character and associated flow control character) and IDLE characters may be taken into account to determine the maximum defined period between IDLE characters.

Figure 4A:
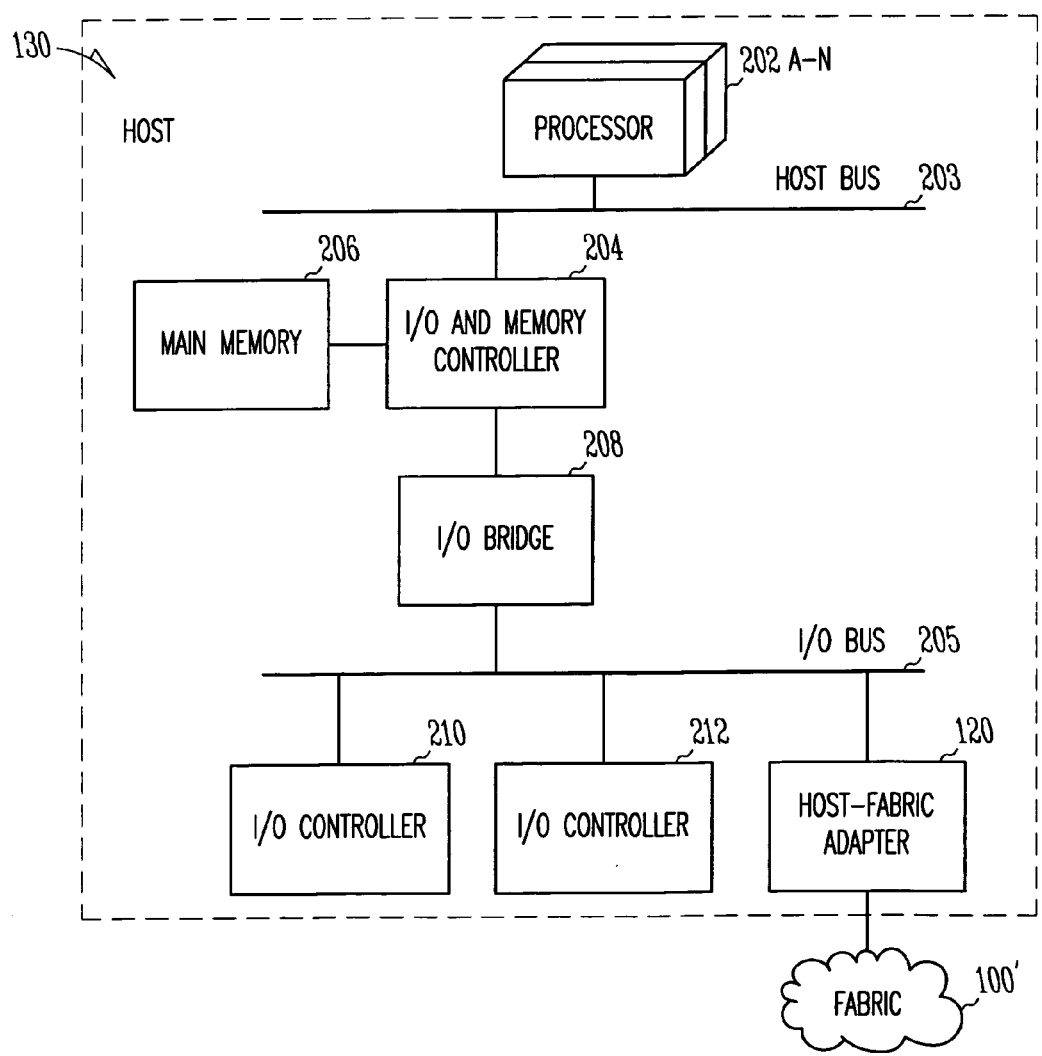
FIGS. 4A–4B illustrate a block diagram of an example host system of an example data network according to different embodiments of the present invention.

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4B:
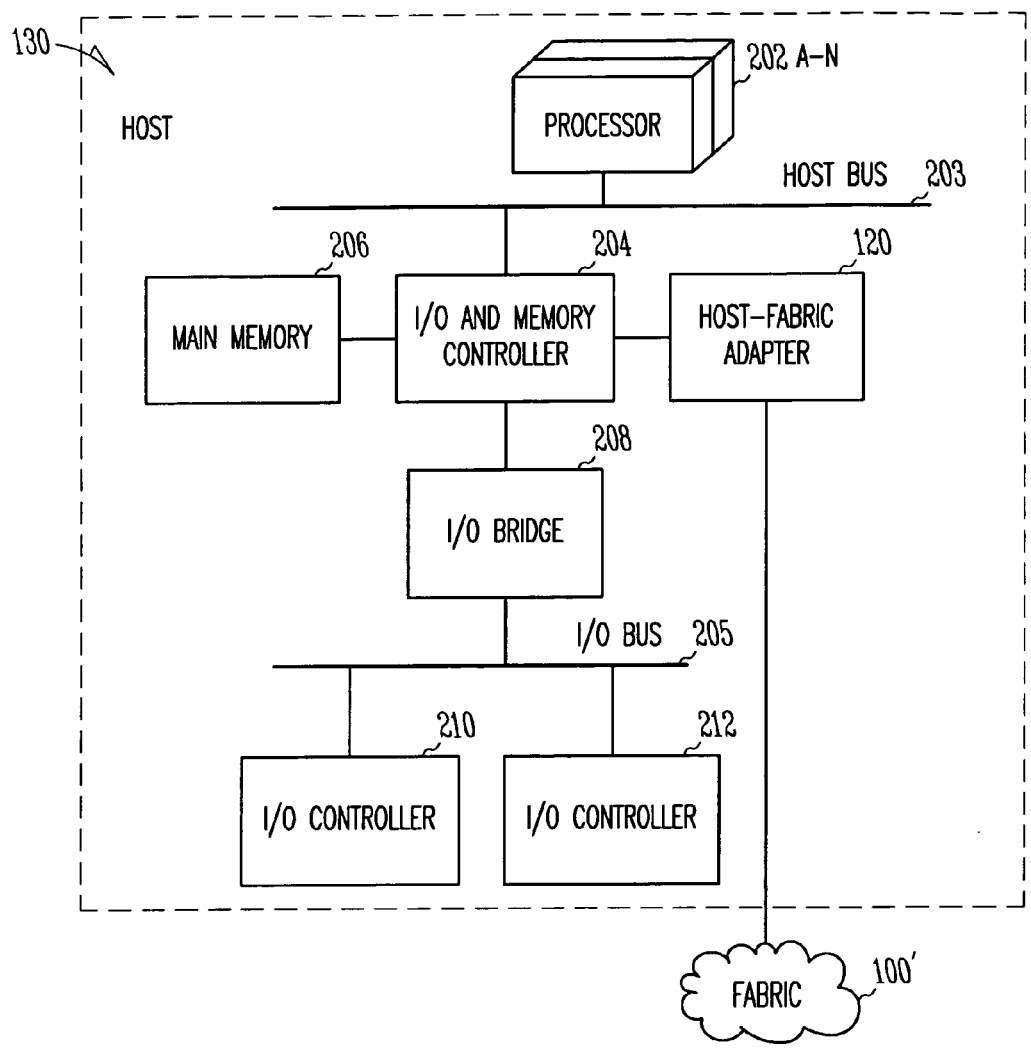

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B. In either embodiment shown in FIGS. 4A–4B, one or more host-fabric adapters 120 may be provided to interface the host system 130 to the NGIO switched fabric 100'.

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
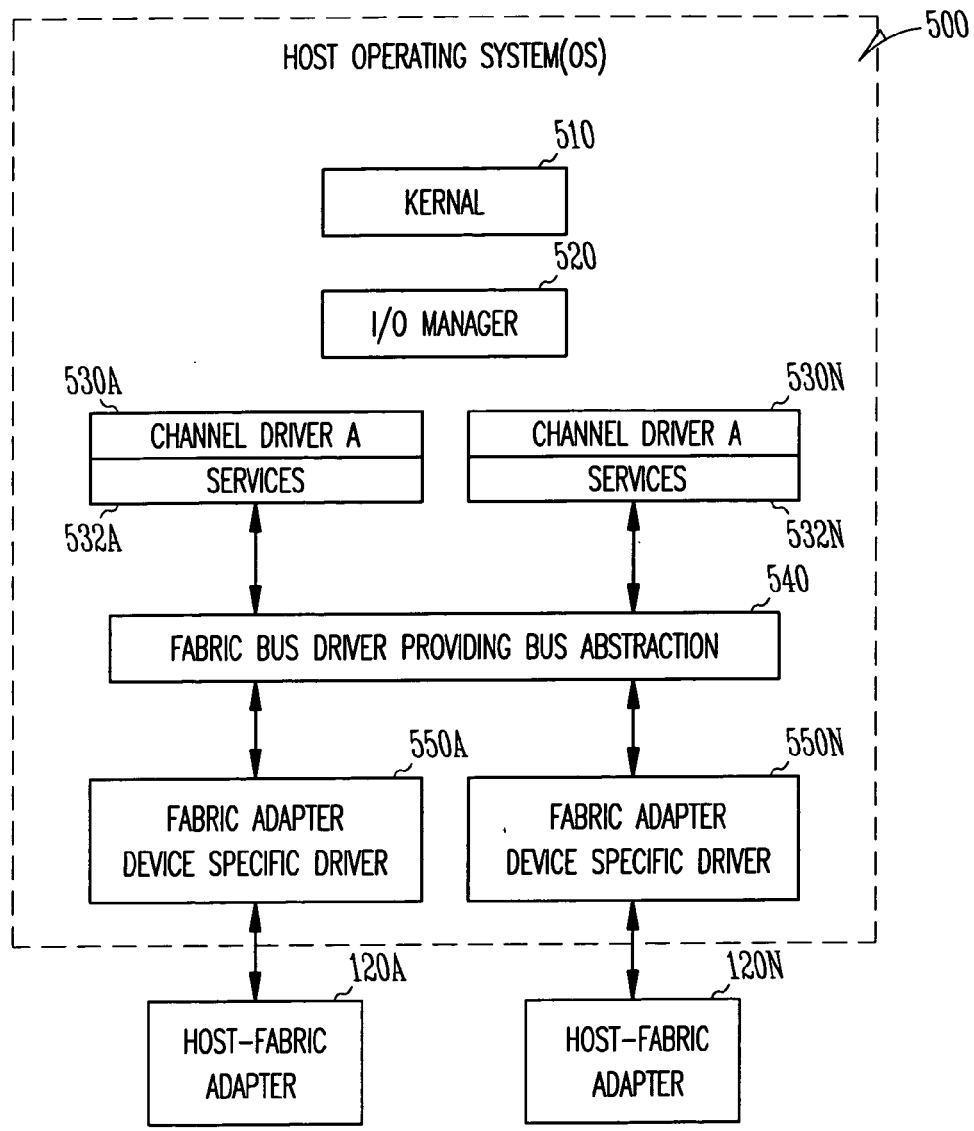
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (HCA) driver module may consist of three functional layers: a HCA services layer (HSL), a HCA abstraction layer (HCAAL), and a HCA device-specific driver (HDSD) in compliance with the "Next Generation I/O Architecture: Host Channel Adapter Software Specification", the "Next Generation I/O: Intel HCA Connection Services Layer High Level Design", the "Next Generation I/O: Intel HCA Abstraction Layer High Level Design", and the "Next Generation I/O: Intel HCA Fabric Services Layer High Level Design" as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997. VI architecture comprises four basic components: virtual interface (VI) of pairs of works queues (send queue and receive queue) in which requests, in the form of descriptors, are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. Under the VI architecture, the host-fabric adapter 120 and VI Kernel agent may constitute the VI provider to perform endpoint virtualization directly and subsume the tasks of multiplexing, de-multiplexing, and data transfer scheduling normally performed by the host operating system (OS) kernel 510 and device specific driver 4550A–550N as shown in FIG. 5. However, other architectures may also be used to implement the present invention.

Figure 6:
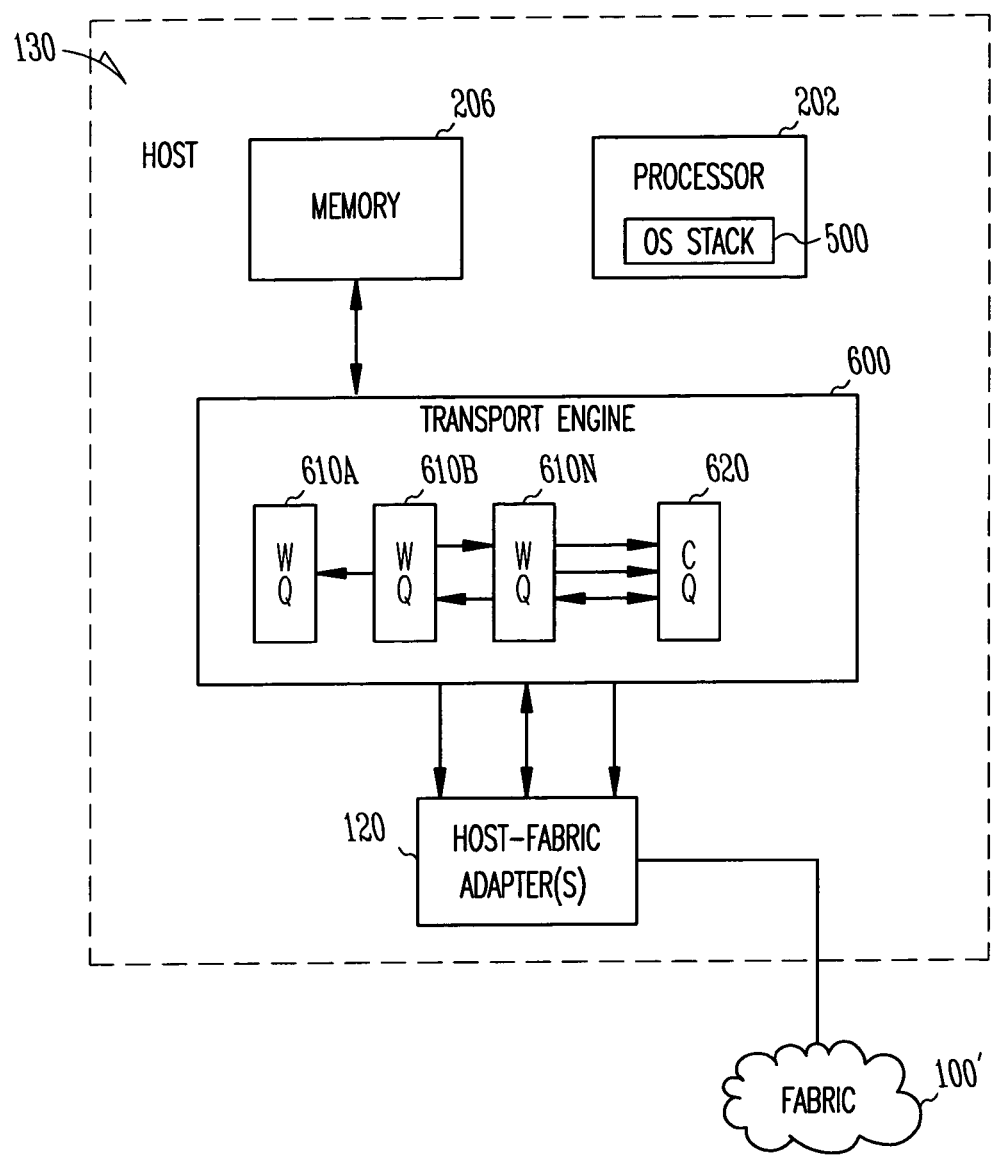
FIG. 6 illustrates a block diagram of an example host system using NGIO/InfiniteBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A–4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example, message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

Figure 7:
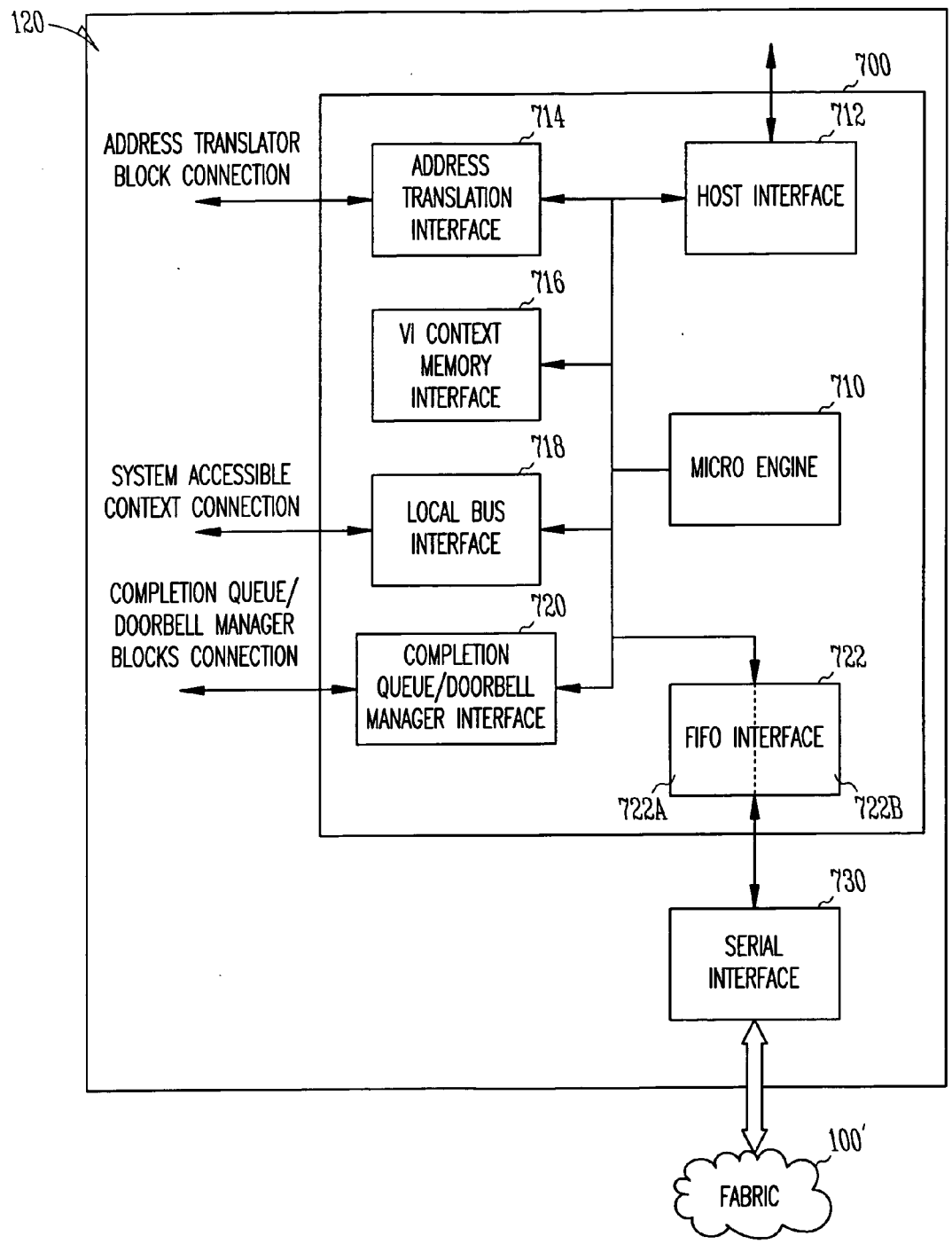
FIG. 7 illustrates an example host-fabric adapter configured in accordance with NGIO/InfiniBandT™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for, but not limited thereto, NGIO/InfiniBand™ applications with minimal hardware investment, including controlling execution of NGIO/InfiniBand™ protocols with minimal pipelining and NGIO/InfiniBand™ cell data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100'. The micro-controller subsystem 700 contains one or more programmable direct-memory-access (DMA) engine(s) known as a Micro-Engine (ME) 710 utilized to build, send, receive and acknowledge NGIO/InfiniBand™ cells/packets between the host memory 206 (see FIG. 6) and a serial link, and special purpose hardware interface logic blocks such as a host interface 712, an address translation interface 714, a VI context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue management.

The Micro-Engine (ME) 710 may execute MicroCode to coordinate send queue and receive queue operations for transmitting and receiving NGIO/InfiniBand™ cells/packets and to support completion queues and channels in compliance with the NGIO/InfiniBand protocols. The Micro-Engine (ME) 710 may also control all the interface blocks through a set of micro register reads and writes. Micro registers may be available with data supplied by multiple interface blocks to help speed up MicroCode functions.

The host interface 712 provides an interface to either an I/O bus 205 of a host system 130 as shown in FIG. 4A, or an I/O and memory controller 204 of a host system 130 as shown in FIG. 4B for host transactions, including controlling arbitration and data/control multiplexing between different requesters, read and write transactions to the host system 130 and facilitating read completions.

The address translation interface 714 provides an interface to an address translation block (not shown) responsible for managing the conversion of virtual address (used to address program space) to physical addresses (used to address system space) and validating access to memory.

The context memory interface 716 provides an interface to a context manager (not shown) responsible for providing the necessary context for a work queue pair (WQP) used for sending and receiving NGIO/InfiniBand™ cells/packets. The context memory interface 716 also provides an interface to host software and presents different types of memory mapped register sets which specify channel configurations and to initiate channel operations. For example, the memory mapped register sets may include global HCA context registers which affect the operation of work queues (WQ), work queue pair (WQP) registers which control the establishment of channels, and completion queue (CQ) registers which specify the location and length of a completion queue (CQ) in host memory 206 and control whether interrupts are generated when completion queue (CQ) entries are written.

The local bus interface 718 provides an interface to a local data bus responsible for supporting system accessible context connections and channel operations, and for turning the signal data into appropriate forms for the Micro-Engine (ME) 710, including MicroCode loading.

The completion queue/doorbell manager interface 720 provides an interface to completion queues, and doorbell manager and memory registration rules of the VI architecture.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a Transmit FIFO and a serial interface 730.

The Receive FIFO interface 722A may be used by the Micro-Engine (ME) 710 to process the incoming data cell/packet, via the serial interface 730, including checking the cell header for errors and checking if additional data needs to be read before passing the same to the host interface 712. The Transmit FIFO interface 722B may be used by the Micro-Engine (ME) 710 to build cells/packets for subsequent transmission, via the serial interface 730.

In addition, a Scheduler (not shown) may also be included for scheduling the next Virtual Interface (VI) to the context manager and supporting priority of traffic for data cells or packets associated with send work queues and receive work queues. Such a Scheduler may be provided to interface with the context memory interface 716, the local bus interface 718 and the completion queue/doorbell manager interface 720 for scheduled functions.

Figure 8:
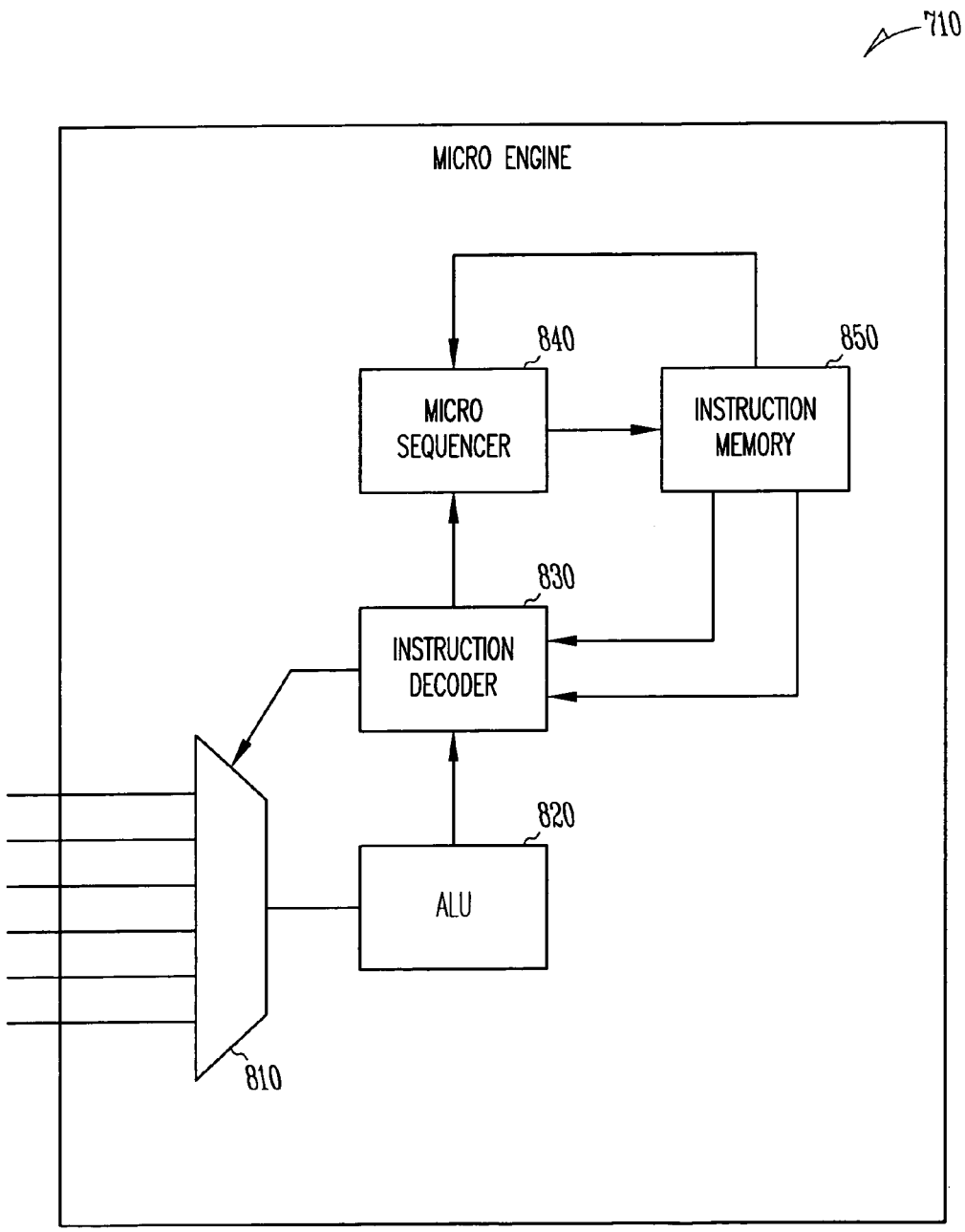
FIG. 8 illustrates an example Micro-Engine (ME) of a host-fabric adapter according to an embodiment of the present invention.

FIG. 8 illustrates a general example Micro-Engine (ME) 710 configured to handle multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
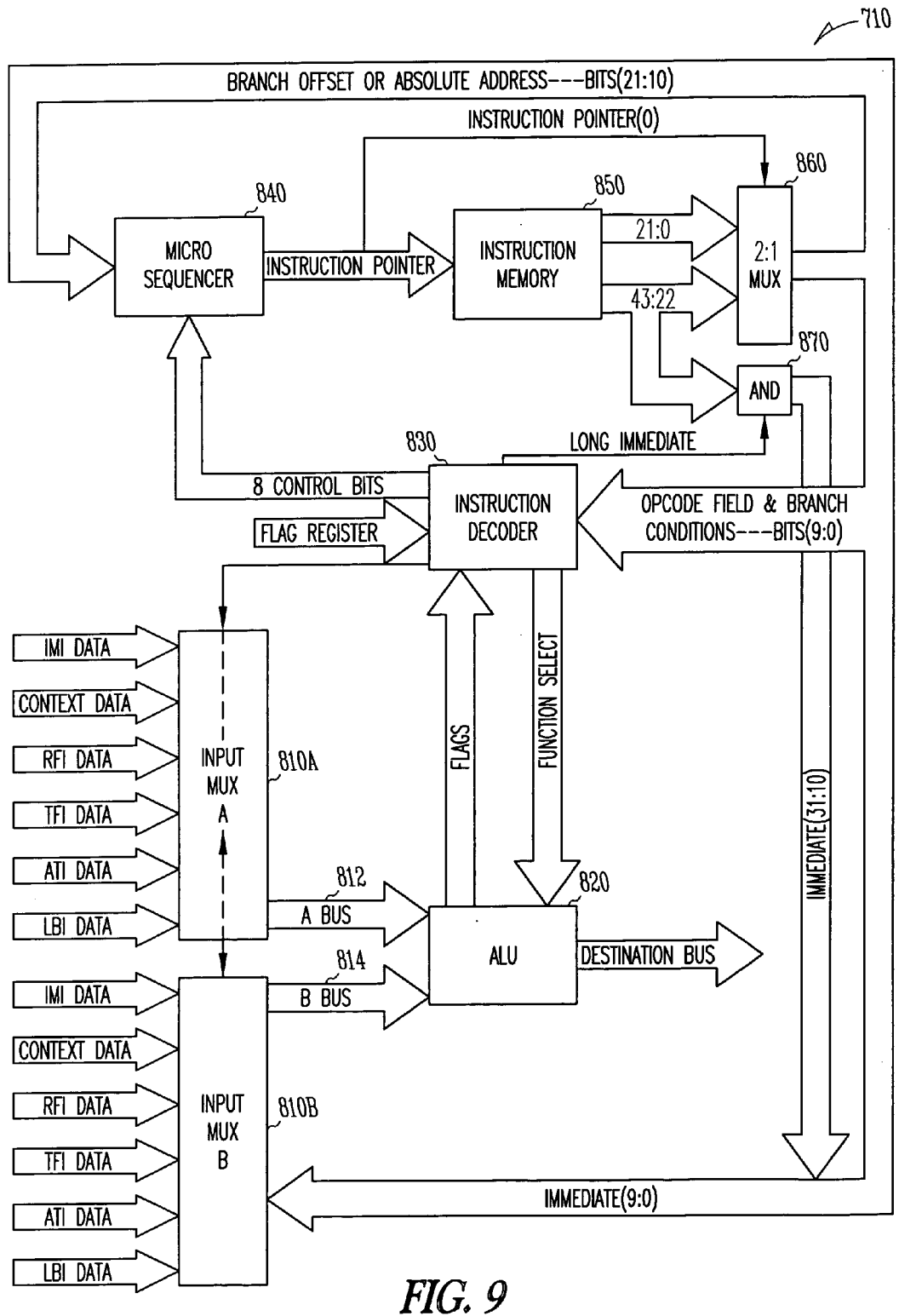
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 hereinbelow:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory 716, the local bus interface 718, the completion queue/doorbell manager interface 720, and the first-in/first-out (FIFO) interface 722 needed to control many ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. Micro-Code may be downloadable into the SRAM for changes in future NGIO/InfiniBand™ specification enhancements. The SRAM may contain 2K x 44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different code formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

Major challenges implementing a host-fabric adapter as shown in FIG. 7 are to maximize performance of the Micro-Engine (ME) 710 and to efficiently use ME resources in processing NGIO/InfiniBand™ cells/packets with minimal latency. Hardware Assist (HWA) Logics may be incorporated into one or more special purpose hardware interface logic blocks, such as the host interface 712, the address translation interface 714, the VI context memory interface 716, the local bus interface 718, the completion queue/doorbell manager interface 720, and the FIFO interface 722, in order to assist their respective interface functions and to help offloading the Micro-Engine (ME) 710 from some hardware calculations to process NGIO/InfiniBand™ cells/packets. For example, Hardware Assist (HWA) Logics may be implemented in the host interface 712 to pre-process data transfer requests, in the form of descriptors, posted to describe data movement operation and location of data to be moved for processing and/or transportation via a switched fabric 100', or in the FIFO interface 722 to the Virtual Address (VA) and Memory Handle (MH) of an incoming cell/packet via a serial interface 730 so as to help offloading the Micro-Engine (ME) 710 from host descriptor format checking operations and protection index and descriptor offset calculations.

Figure 10:
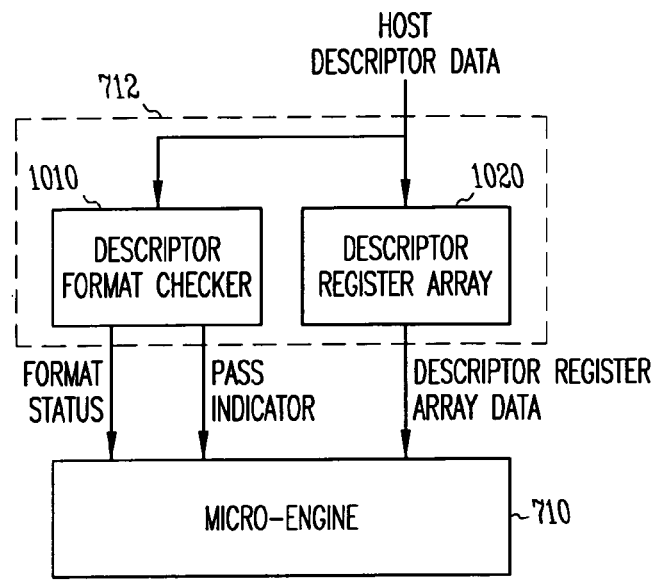
FIG. 10 illustrates an example host interface having a hardware assist architecture according to an embodiment of the present invention.

More specifically, FIG. 10 illustrates an example host interface having a Hardware Assist (HWA) Logic according to an embodiment of the present invention. Such a host interface HWA Logic may be incorporated into the host interface 712 to pre-process NGIO/InfiniBand™ descriptors in parallel with descriptor fetches so as to offload the Micro-Engine (ME) 710 from having to check for descriptor format errors. As shown in FIG. 10, the host interface Hardware Assist (HWA) Logic may comprise a Descriptor Format Checker 1010 arranged to check host descriptor data from the host system 130 requested by the Micro-Engine (ME) 710 for descriptor format errors using descriptor format rules and descriptor contents, and a Descriptor Register Array 1020 arranged to supply descriptor status information to the Micro-Engine (ME) 710 when the descriptor fetch is complete. Both the Descriptor Format Checker 1010 and the Descriptor Register Array 1020 are arranged in parallel so that descriptor format errors can be checked in parallel to descriptor fetching operations. This way ME performance can be maximized since the Micro-Engine (ME) 710 is spared from processing all descriptors from host memory 206. As a result, a lesser number of logic gates required to implement the Micro-Engine (ME) 710 can be obtained for low cost and high speed processing of NGIO/InfiniBand™ cells/packets. Likewise, minimal latency can be assured since only one-cycle is needed by the Micro-Engine (ME) 710 to test the error bit.

Descriptors from the host system 130 typically provide all the information needed to complete Send, Receive, RDMA Write, and RDMA Read operations, via the switched fabric 100'. Each send/receive descriptor may be utilized to control the transmission or reception of a single data cell/packet. RDMA descriptors may contain additional information indicating the address of remote information. Unlike send/receive operations where the remote system is also using a descriptor to determine where to transfer message data to or from, RDMA descriptors specifically instruct the target where to transfer the message data to or from, via the use of Virtual Address (VA) and Memory Handle (MH) sent to the remote system. Generally, each descriptor may begin with a control segment followed by an optional address segment and an arbitrary number of data segments. Control segments may contain control and status information. Address segments, for read/write RDMA operations, may contain remote buffer information (i.e., memory associated with the VI targeted to receive the read/write request). Data segments, for both send/receive and read/write RDMA operations, may contain information about the local memory (i.e., memory associated with the VI issuing the send/receive or read/write request).

Figure 11A:
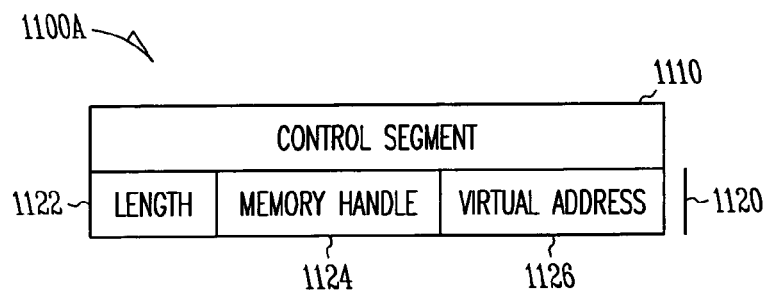
FIGS. 11A–11B illustrate different examples of VI architecture descriptors according to an embodiment of the present invention.

FIG. 11A illustrates an example send/receive type descriptor 1100A according to an embodiment of the present invention. As shown in FIG. 11A, the send/receive descriptor 1100A may comprise a control segment 1110 and a data segment 1120 which includes a segment length field 1122, a memory handle field 1124, and a virtual address field 1126. Segment length 1122 specifies the length of the message data to be sent or that is to be received. Memory Handle (MH) 1124 may be used to verify that the sending/requesting process (i.e., VI) owns the registered memory region indicated by segment length 1122 and Virtual Address (VA) 1126. For a send operation, Virtual Address (VA) 1126 identifies the starting memory location of the message data to be sent in the sending VI's local memory space. For a receive operation, Virtual Address (VA) 1126 identifies the starting memory location of where the received message data is to be stored in the requesting VI's local memory space.

Figure 11B:
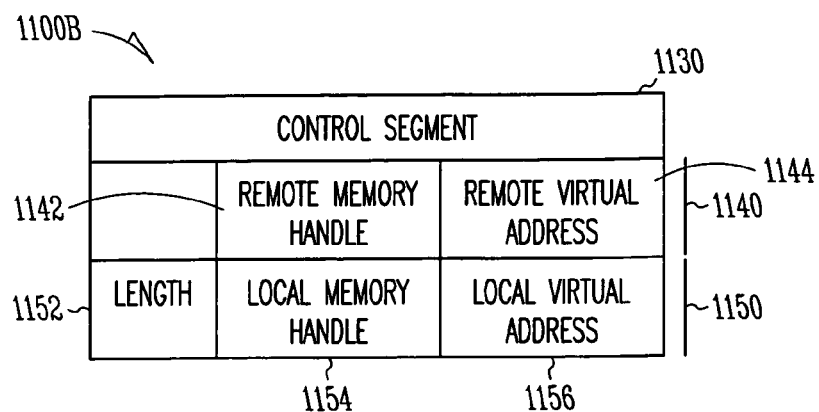

FIG. 11B illustrates an example read/write RDMA type descriptor 1110B according to an embodiment of the present invention. As shown in FIG. 11B, the read/write RDMA descriptor 1100B may comprise a control segment 1130, an address segment 1140, and a data segment 1150. Address segment 1140 contains a remote memory handle field 1142 and a remote virtual address field 1144. Data segment 1150 contains a segment length field 1152, a local memory handle field 1154, and a local virtual address field 1156. For a read operation, remote Virtual Address (VA) 1144 identifies the memory location in the remote process' memory space, of the message data to be read. Local Virtual Address (VA) 1156 identifies the starting memory location in the local process' memory space of where the received message is to be placed. The amount of memory to be used to store the message data may be specified by segment length field 1152. For a write operation, remote Virtual Address (VA) 1144 identifies the memory location in the local process' memory space of the message data to be written. Local Virtual Address (VA) 1156 identifies the starting memory location in the local process' memory space of where the message data is read from. The size of the message data is specified by segment length field 1152. Remote Memory Handle (MH) 1154 corresponds to the Memory Handle (MH) associated with the memory identified by remote Virtual Address (VA) 1144. Local Memory Handle 1154 corresponds to the Memory Handle (MH) associated with the memory identified by local Virtual Address 1156.

Before the descriptors are processed by the Micro-Engine (ME) 710, the descriptors are loaded into the Descriptor Register Array 1020, as shown in FIG. 10, that is addressable by the Micro-Engine (ME0 710. As NGIO/InfiniBand™ descriptors with different formats are loaded into the Descriptor Register Array 1020, the Descriptor Format Checker 1010 uses internal compare logic to snoop the host descriptor data for determining the descriptor type and checking the remainder of a descriptor for descriptor errors based on the descriptor type. A pass/fail indication may then be supplied to the Micro-Engine (ME) 710 when the descriptor fetch is complete. The Micro-Engine (ME) 710 then checks for error status when the descriptor has been completely loaded into the Descriptor Register Array 1020. The format errors detected may include: (1) Read/Write RDMA segment count in legal range; (2) Illegal descriptor commands; (3) Connection-less destination field errors; and (4) Descriptor done bit set errors.

The pass/fail indication output from the Descriptor Format Checker 1010 to the Micro-Engine (ME) 710 may correspond to a single bit indicating if all of the checks have passed. The Micro-Engine (ME) 710 then uses this pass/fail indication bit to determine whether to proceed with the processing of this descriptor or if the host system 130 is to be notified of a host error.

When the descriptor is processed by the Micro-Engine (ME) 710, the Virtual address (VA) and the associated Memory Handle (MH) of the host descriptor as shown in FIGS. 11A–11B may be used to calculate a Protection Index (PI) and Offset. Typically the Virtual Address (VA) field may be 64-bit, and the associated Memory Handle (MH) field may be 32-bit. Additional Hardware Assist (HWA) Logics (not shown) may be included in the host interface 712 to process the 64-bit Virtual Address (VA) and the associated 32-bit Memory Handle (MH) of the host descriptor to calculate a 24-bit Protection Index (PI) and a 12-bit Offset. The 12-bit Offset is the result of using 4 KBytes virtual memory page sizes, and is common between the virtual and physical address to indicate which bytes within a single page are being addressed. Such a Protection Index (PI) and Offset may then be used to identify an entry of a Translation and Protection (TPT) Table stored in host memory 206 (see FIG. 6) for translating virtual addresses (used to address program space) to physical addresses (used to address system space). Each TPT entry may correspond to a single page of registered host memory 206, typically 4 KBytes of physically contiguous host memory 206 on which the posted descriptor is located. From the identified TPT entry, the physical address associated with Virtual Address (VA) may be obtained. In send operation, Virtual Address (VA) and Memory Handle (MH) may correspond to memory handle field 1124 and virtual address field 1126 of the data segment 1120 as shown in FIG. 11A. In read and write operations, Virtual Address (VA) and Memory Handle (MH) may correspond to remote memory handle 1142 and remote virtual address field 1144 of the address segment 1140 on the remote host-fabric adapter, and local memory handle field 1154 and local virtual address field 1156 of the data segment 1150 on the local host-fabric adapter 120 as shown in FIG. 11B.

Figure 12:
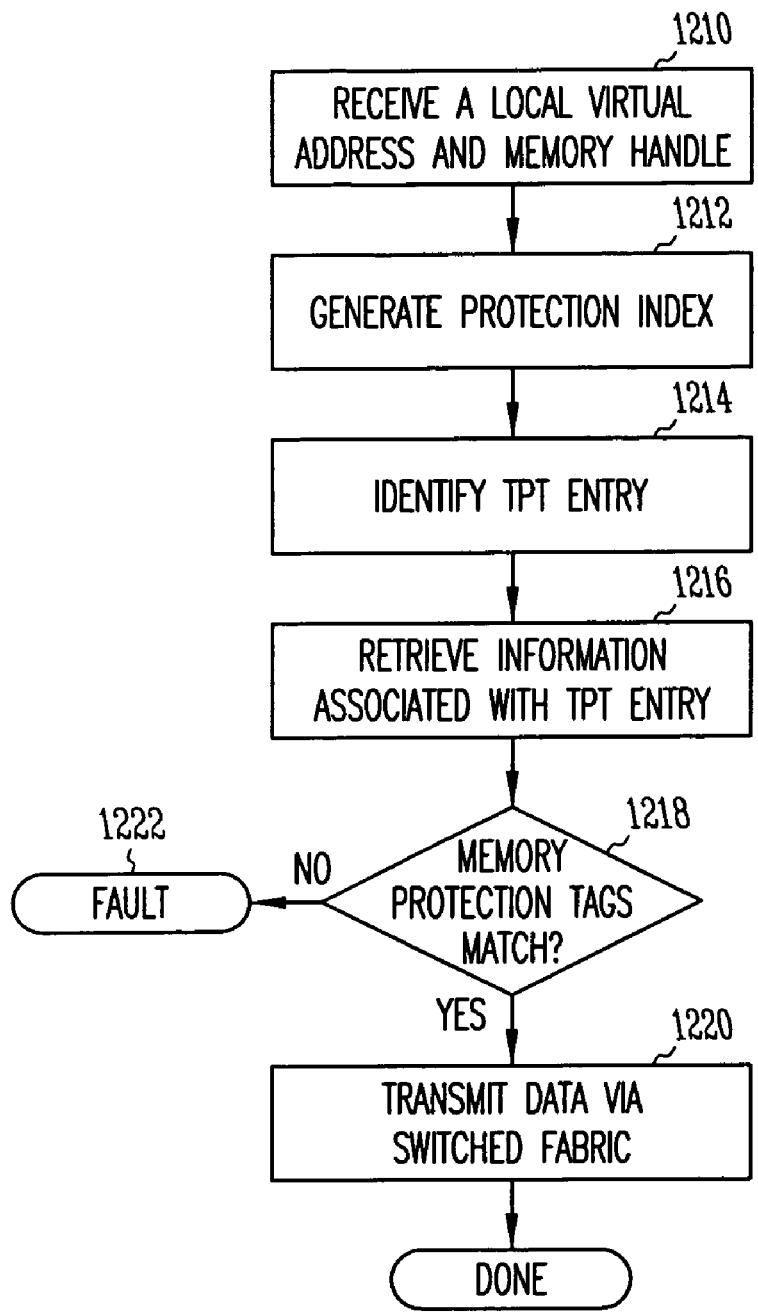
FIG. 12 illustrates an example send descriptor processing technique according an embodiment of the present invention.

For purposes of completeness, an example send descriptor may be processed by the Micro-Engine (ME) 710 in the manner as shown in FIG. 12. In step 1210, the Micro-Engine (ME) 710 retrieves message data's starting Virtual Address (VA) 1126 (in the local, or sending process' memory space), and a Memory Handle (MH) 1124 associated with the message data's memory region. Virtual Address (VA) 1126 and Memory Handle (MH) 1124 may be used to calculate a Protection Index (PI) and Offset (step 1212). The Protection Index (PI) and Offset are then used to identify and retrieve translation information (physical address) stored in a TPT entry that corresponds to a single page of registered host memory 206 on which the posted descriptor is located (steps 1214 and 1216). If the retrieved Protection Tag matches the Protection Tag associated with the local (sending) process (step 1218), the Micro-Engine (ME) 710 enables sending the message data toward the destination (remote system) by transmitting the same via the switched fabric 100' (see FIGS. 1–3). If the retrieved Protection Tag and the sending process' Protection Tag do not match, a memory protection fault may be generated (step 1222) and no message data may be transferred via the switch fabric 100'. Receive descriptors may be processed in an analogous fashion.

Figure 13:
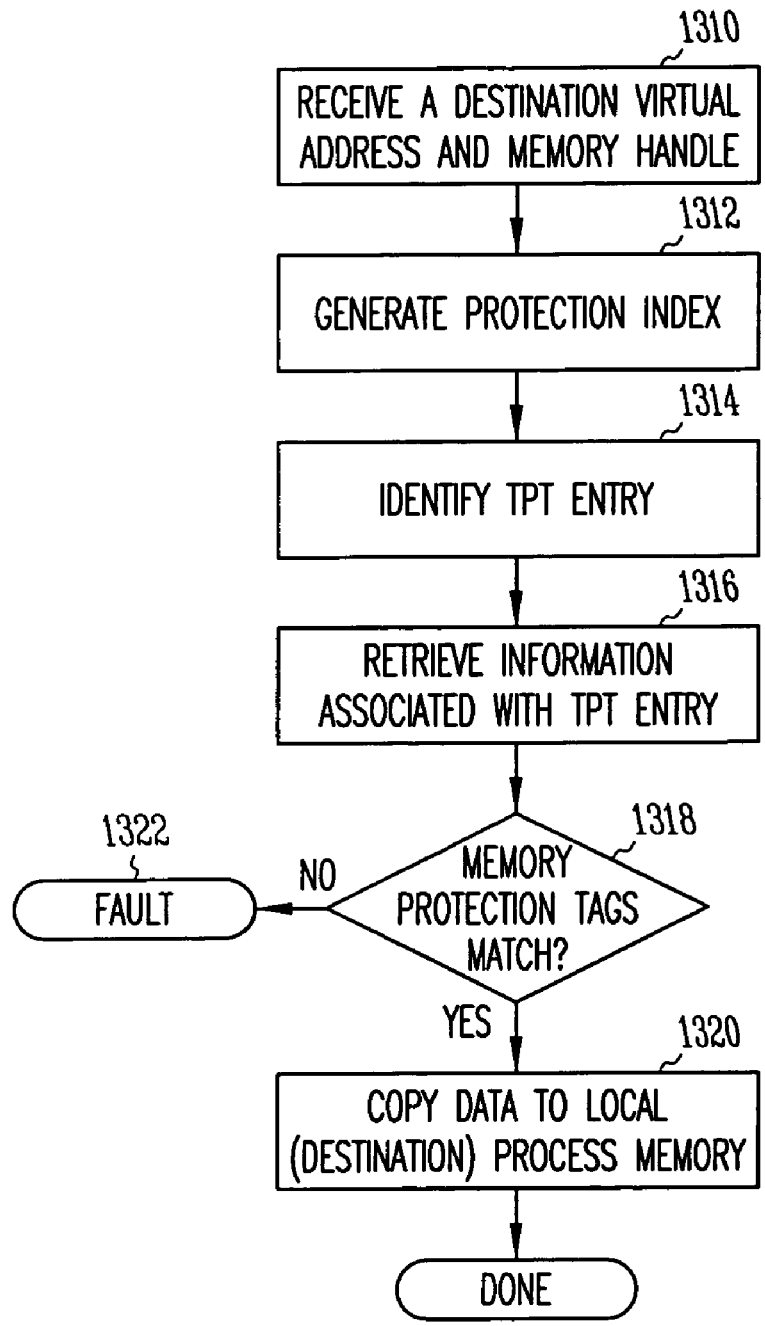
FIG. 13 illustrates an example write descriptor processing technique according an embodiment of the present invention.

Similarly, an example read descriptor may be processed by the Micro-Engine (ME) 710 in the manner as shown in FIG. 13. In step 1310, the Micro-Engine (ME) 710 retrieves the message data's destination Virtual Address (VA) 1156 (in the local, or receiving process' memory space), a Memory Handle (MH) 1154 associated with the message data's destination memory region, and indication of how long the incoming message data is 1152. The Virtual Address (VA) 1156 and Memory Handle (MH) 1154 may be used to calculate a Protection Index (PI) and Offset (step 1312). The Protection Index (PI) and Offset are then used to identify and retrieve translation information (physical address) stored in a TPT entry that corresponds to a single page of registered host memory 206 on which the posted descriptor is located (steps 1314 and 1316). If the retrieved Protection Tag matches the Protection Tag associated with the local (receiving) process (step 1318), the Micro-Engine (ME) 710 enables copying of the message data into the local process' memory (host memory 206). If the retrieved Protection Tag and the receiving process' Protection Tag do not match, a memory protection fault is generated (step 1322) and no message data may be copied to the local process' memory (host memory 206). Write descriptors may be processed in an analogous fashion.

Figure 14:
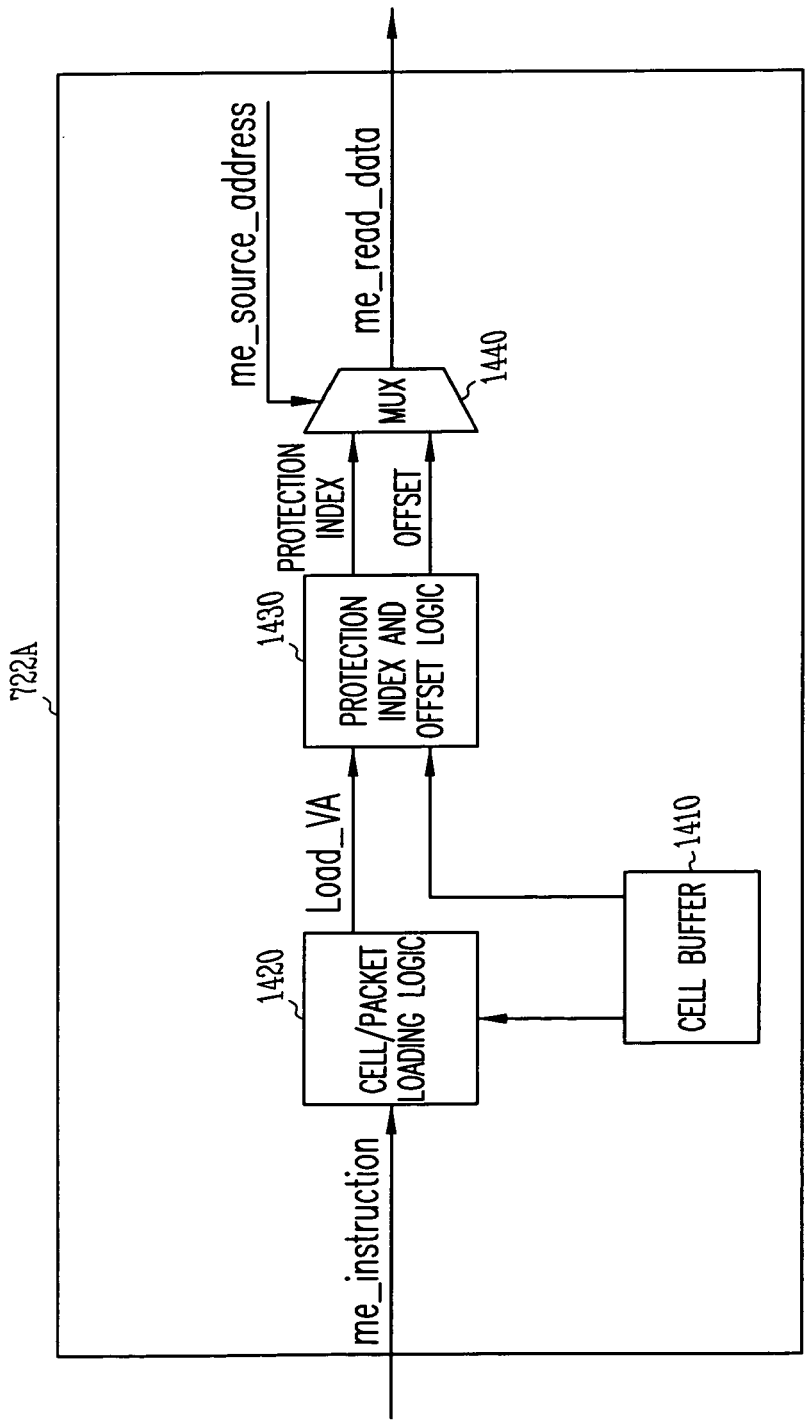
FIG. 14 illustrates an example Receive FIFO interface having a hardware assist architecture according to an embodiment of the present invention.

Referring now to FIG. 14, an example Receive FIFO interface having a Protection Index and Offset Hardware Assist (HWA) Logic according to an embodiment of the present invention is illustrated. Such a Protection Index and Offset Hardware Assist (HWA) Logic may be incorporated into the Receive FIFO interface (RFI) 722A to process the Virtual Address (VA) and Memory Handle (MH) of an incoming data cell/packet, via the serial interface 730, and generate therefrom the Protection Index (PI) and Offset so as to offload the Micro-Engine (ME) 710 from processing NGIO/InfiniBand™ cells/packets for RDMA read/write operations with minimal hardware investment.

As shown in FIG. 14, the Protection Index and Offset Hardware Assist (HWA) Logic may comprise a cell/packet Buffer 1410, a cell/packet Loading Logic 1420, a Protection Index and Offset Logic 1430, and a Multiplexer 1440. The cell/packet Buffer 1410 may be arranged to receive an incoming data cell/packet including a Virtual Address (VA) and associated Memory Handle (MH), as described with reference to FIG. 3, from the serial interface 730. An example implementation of such a cell/packet Buffer 1410 may be a single cell/packet first-in/first-out (FIFO) storage device arranged to temporarily store single data cell/packets from the serial interface 730. The cell/packet Loading Logic 1420 may be arranged to start loading cell/packet buffer data from the cell/packet Buffer 1410 in response to an ME instruction from the Micro-Engine (ME) 710. The Protection Index and Offset Logic 1430 may be arranged to calculate a Protection Index (PI) and Offset based on the Virtual Address (VA) and associated Memory Handle (MH) of the cell/packet buffer data from the cell/packet Buffer 1410 in accordance with a load Virtual Address (VA) request from the cell/packet Loading Logic 1420. The Multiplexer 1440 may then be arranged to select as an output (me_read_data) the Protection Index (PI) and Offset needed for each task of the Micro-Engine (ME) 710 in response to an ME instruction (me_source_address) from the Micro-Engine (ME) 710.

Protection Index (PI) and Offset may be calculated by the Protection Index and Offset Logic 1430 using the following formula:

$$\text{Offset} = VA(11:0); \text{ and}$$

$$\text{Protection Index } (PI) = VA(43:12) - MH(31:0),$$

If the Memory Handle (MH) is equal to zero, then the Protection Index (PI) equals the Virtual Address (VA), since the Memory Handle (MH) is subtracted from the Virtual Address (VA). The Offset is the lower 12-bits of the Virtual Address (VA) to indicate which bytes within a single page are being addressed.

Figure 15:
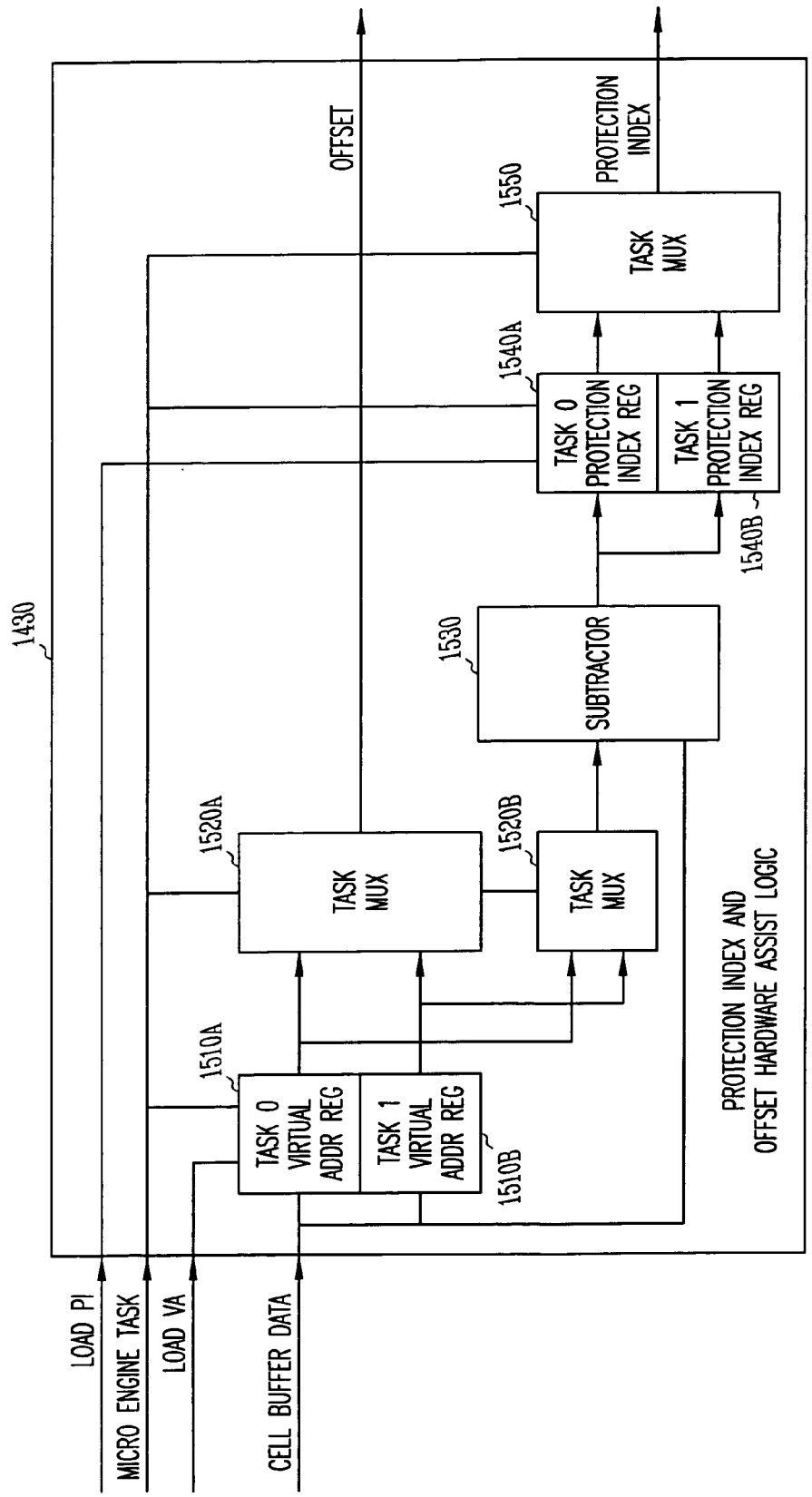
FIG. 15 illustrates an example Protection Index and Offset Hardware Assist (HWA) Logic of the Receive FIFO interface for multitasking according to an embodiment of the present invention.
Figure 16:
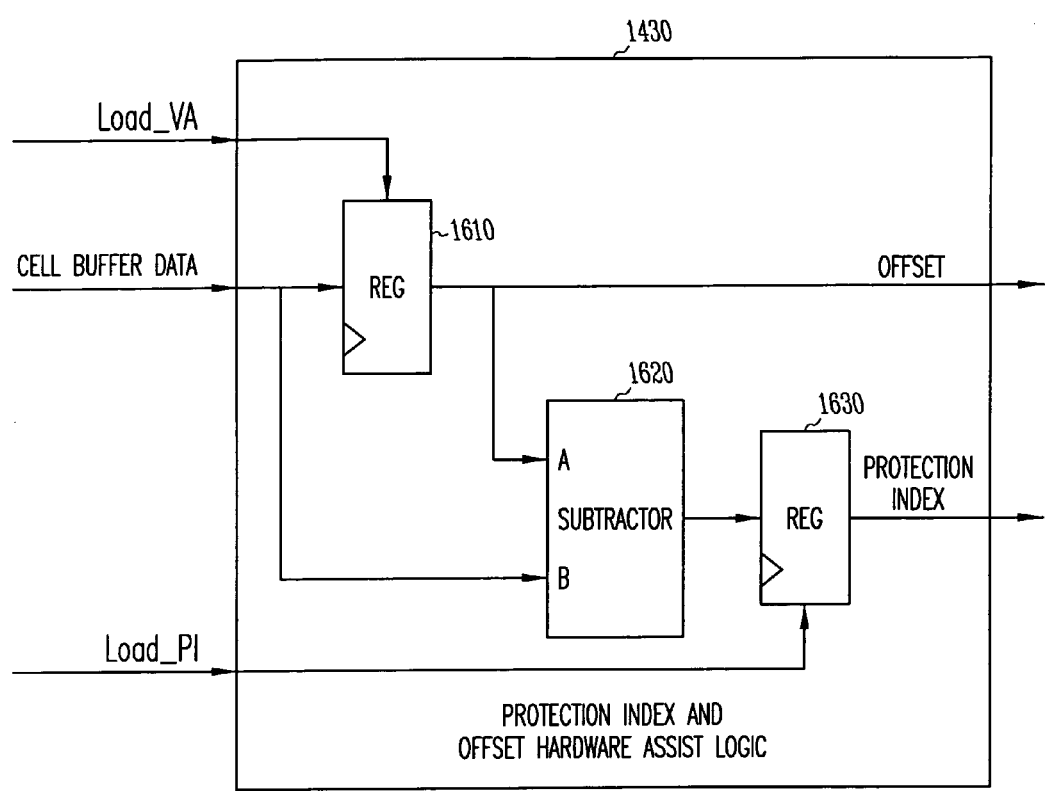
FIG. 16 illustrates an example Protection Index and Offset Logic Block of the Receive FIFO interface for single tasking according to an embodiment of the present invention.

The Protection Index and Offset Logic 1430 may be configured differently depending upon whether the Micro-Engine (ME) 710 is executed for multitasking or single tasking. For example, FIG. 15 illustrates an example Protection Index and Offset Hardware Assist (HWA) Logic 1430 for a multitasking Micro-Engine (ME) according to an embodiment of the present invention. Alternatively, FIG. 16 illustrates an example Protection Index and Offset Logic Block for a single-tasking Micro-Engine (ME) 710 according to an embodiment of the present invention. FIGS. 17A–17H illustrate an example timing diagram of the Protection Index and Offset generation according to an embodiment of the present invention.

Referring to FIG. 15, the Protection Index and Offset Logic 1430 may comprise a plurality of task Virtual Address Registers 1510A–1510B, corresponding task Multiplexers 1520A–1520B, a Subtractor 1530, a plurality of task Protection Index Registers 1540A–1540B, and an output task Multiplexer 1550. The task Virtual Address Registers 1510A–1510B may be arranged to receive the Virtual Address (VA) from the cell buffer data as shown in FIG. 3 and FIG. 17B and the load Virtual Address (load_VA) as shown in FIG. 17C in response to an ME task. The corresponding task Multiplexers 1520A–1520B may be arranged to obtain the Offset from the Virtual Address (VA) from the cell buffer data previously registered in different Virtual Address Registers 1510A–1510B as shown in FIG. 17H. The Subtractor 1530 may be arranged to subtract the Memory Handle (MH) of the cell buffer data input, via B-terminal, as shown in FIG. 17F from the Virtual Address (VA) of the cell buffer data previously registered and input, via A-terminal, as shown in FIG. 17E. The task Protection Index Registers 1540A–1540B may be arranged to load the result of the subtraction in accordance with the load Protection Index (PI) request and the ME task. And the output task Multiplexer 1550 may then be arranged to select between outputs of different task Protection Index Registers 1540A–1540B as the Protection Index (PI) as shown in FIG. 17G in response to the ME task.

When the Micro-Engine (ME) 710 reads the Virtual Address (VA), the ME instruction and ME task bit are asserted to capture the Virtual Address (VA) in the correct task Virtual Address Register 1510A–1510B. The Micro-Engine (ME) 710 then reads the memory handle (MH) from the cell buffer data, which is input to the Subtractor 1530, along with the Virtual Address (VA) that was previously registered. The result of the subtraction may then be loaded into the appropriate task Protection Index Register 1540A–1540B. The Micro-Engine (ME) 710 now has the Protection Index (PI) and Offset available and may use this information in the processing of the data cell/packet.

The number of task Virtual Address Registers 1510A–1510B and the task Protection Index Registers 1540A–1540B is not limited to those shown in FIG. 15. Rather, the number of Registers used may correspond to the number of tasks performed by the Micro-Engine (ME) 710. For example, FIG. 16 illustrates an example Protection Index and Offset Logic Block 1430 for a single-tasking Micro-Engine (ME) 710 according to an embodiment of the present invention. As shown in FIG. 16, the Protection Index and Offset Logic Block 1430 may only contain a single input Register 1610 arranged to receive the cell buffer data shown in FIG. 17B and generate an Offset shown in FIG. 17H in accordance with a load Virtual Address (load_VA) request shown in FIG. 17C; a Subtractor 1620 arranged to subtract the Memory Handle (MH) of the cell buffer data input, via B-terminal, as shown in FIG. 17F from the Virtual Address (VA) of the cell buffer data previously registered and input, via A-terminal, as shown in FIG. 17E; and a single output Register 1630 arranged to generate a Protection Index (PI) based on the result of the subtraction in accordance with the load Protection Index (PI) request shown in FIG. 17G. The primary advantages of such a Register Architecture as shown in FIGS. 15 and 16 are as follows: (1) Register count may be reduced by 20%; (2) a significant saving of gates (approximately 4000 gates) since only one Subtractor may be used for multiple tasks; (3) calculation of the Protection Index (PI) in hardware assist offloads the Micro-Engine (ME) 710 from doing the calculation so that ME resources may be utilized for faster cell/packet processing.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBandT™ functionality with minimal hardware investment, including controlling execution of NGIO/InfiniBand™ protocols with minimal pipelining. Micro-control subsystem of the host-fabric adapter is designed to control execution of NGIO/InfiniBand™ protocols with minimal pipelining, and to control overall NGIO/InfiniBand™ cell/packet processing with minimum latency.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data packet-switched networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO), InfiniBand™ and Server Net, and a LAN system including Ethernet, FDDI (Fiber Distributed Data Interface) Token Ring LAN, Asynchronous Transfer Mode (ATM) LAN, Fiber Channel, and Wireless LAN. In addition, similar Protection Index and Offset HWA Logic may also be incorporated into the host interface to process the Virtual Address (VA) and Memory Handle (MH) of a host descriptor. Method steps of FIGS. 12 and 13 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter installed at a host system for connecting to a switched fabric of a data network, comprising:
    a Micro-Engine (ME) arranged to establish connections and support data transfers via said switched fabric;
    a serial interface arranged to receive and transmit data packets from said switched fabric for data transfers; and
    a host interface arranged to receive and transmit host data transfer requests, in the form of descriptors, from said host system for data transfers, and incorporated therein a host interface Hardware Assist (HWA) mechanism configured to pre-process host descriptors for descriptor format errors in parallel with descriptor fetches so as to offload said Micro-Engine (ME) from having to check for said descriptor format errors.

2. The host-fabric adapter as claimed in claim 1, wherein said host interface Hardware Assist (HWA) mechanism comprises:
    a Descriptor Format Checker arranged to check host descriptors from said host system for said descriptor format errors using predetermined descriptor format rules and descriptor contents in response to a ME instruction from said Micro-Engine (ME); and
    a Descriptor Register Array arranged in parallel with said Descriptor Format Checker to supply descriptor status information to said Micro-Engine (ME) when descriptor fetching operations are completed.

3. The host-fabric adapter as claimed in claim 2, wherein said host descriptors from said host system provide information needed to complete send/receive, remote direct memory access (RDMA) write/read operations for data transfers, and include send/receive descriptors utilized to control transmission/reception of a single data packet, and remote direct memory access (RDMA) descriptors utilized to additionally indicate the address of remote information.

4. The host-fabric adapter as claimed in claim 1, further comprising:
    a Receive first-in/first out (FIFO) interface arranged to receive data packets from said switched fabric via said serial interface; and
    a Transmit first-in/first out (FIFO) interface arranged to transmit data packets to said switched fabric via said serial interface.

5. The host-fabric adapter as claimed in claim 4, wherein said Receive first-in/first out (FIFO) interface incorporates therein a Protection Index and Offset Hardware Assist (HWA) mechanism configured to process the Virtual Address (VA) and Memory Handle (MH) of an incoming data packet, via the serial interface, and generate therefrom a Protection Index (PI) and Offset so as to offload said Micro-Engine (ME) from processing data packets for RDMA read/write operations.

6. The host-fabric adapter as claimed in claim 5, wherein said Protection Index and Offset Hardware Assist (HWA) mechanism comprises:
    a packet Buffer arranged to temporarily store an incoming data packet from the serial interface;
    a packet Loading Logic arranged to start loading the data packet from said packet Buffer in response to an ME instruction from said Micro-Engine (ME);
    a Protection Index and Offset Logic arranged to calculate the Protection Index (PI) and Offset based on the Virtual Address (VA) and associated Memory Handle (MH) of the incoming data packet from the packet Buffer in accordance with a load Virtual Address (VA) request from said packet Loading Logic; and
    a Multiplexer arranged to select, as an output, the Protection Index (PI) and Offset needed for each task of said Micro-Engine (ME) in response to said ME instruction from said Micro-Engine (ME).

7. The host-fabric adapter as claimed in claim 6, wherein said packet Buffer is a single packet first-in/first-out (FIFO) storage device.

8. The host-fabric adapter as claimed in claim 6, wherein said Protection Index (PI) and Offset are obtained by said Protection Index and Offset Logic using the following formula:

Offset=$VA(11:0)$; and

Protection Index $(PI)=VA(43:12)-MH(31:0)$, where the Offset is the lower 12-bits of the Virtual Address (VA) of the incoming data packet to indicate which bytes within a single page are being addressed.

9. The host-fabric adapter as claimed in claim 6, wherein said Protection Index and Offset Logic comprises:
    a plurality of task Virtual Address Registers arranged to receive the Virtual Address (VA) from the data packet and the load Virtual Address request in response to an ME instruction from said Micro-Engine (ME);
    task Multiplexers arranged to obtain the Offset from the Virtual Address (VA) from the data packet previously registered in different Virtual Address Registers;
    a Subtractor arranged to subtract the Memory Handle (MH) of the data packet input from the Virtual Address (VA) of the data packet;
    a plurality of task Protection Index Registers arranged to load the result of the subtraction in accordance with the load Protection Index (PI) request and the ME instruction from said Micro-Engine (ME); and
    an output Multiplexer arranged to select between outputs of different task Protection Index Registers as the Protection Index (PI) in response to the ME instruction from said Micro-Engine (ME).

10. The host-fabric adapter as claimed in claim 6, wherein said Protection Index and Offset Logic comprises:
    a first Register arranged to receive the data packet and generate therefrom the Offset in accordance with the load Virtual Address request;

a Subtractor arranged to subtract the Memory Handle (MH) from the Virtual Address (VA) of the data packet; and a second Register arranged to generate the Protection Index (PI) based on the result of the subtraction in accordance with the load Protection Index (PI) request.

11. The host-fabric adapter as claimed in claim 4, further comprising:

an address translation interface which provides an interface for address translation, and which is addressable by write data and system controls from said Micro-Engine (ME), via a system data bus and a system control bus;

a context memory which provides an interface to a context manager, and which is addressable by write data and system controls from said Micro-Engine (ME), via said system data bus and said system control bus, for providing the necessary context for a work queue pair used for sending and receiving data packets;

a local bus interface which provides an interface to a local bus, and which is addressable by write data and system controls from said Micro-Engine (ME), via said system data bus and said system control bus, for supporting system accessible context connections and data transfers; and a completion queue/doorbell manager interface which provides an interface to completion queues, and doorbell and memory registration rules, and which is addressable by write data and system controls from said Micro-Engine (ME), via said system data bus and said system control bus.

12. The host-fabric adapter as claimed in claim 4, wherein said Micro-Engine (ME) comprises:

one or more Data Multiplexers arranged to supply appropriate interface data based on an ME instruction;

an Instruction Memory arranged to provide said ME instruction based on downloadable microcode;

an Arithmetic Logic Unit (ALU) arranged to perform mathematical, logical and shifting operations, and supply write data to the host interface, the address translation interface, the context memory interface, the local bus interface, the completion queue/doorbell manager interface, the Receive first-in/first out (FIFO) interface and the Transmit first-in/first out (FIFO) interface, via said system write data bus; and an Instruction Decoder arranged to supply system controls to the host interface, the address translation interface, the context memory interface, the local bus interface, the completion queue/doorbell manager interface, the Receive first-in/first out (FIFO) interface and the Transmit first-in/first out (FIFO) interface, via said system control bus, to execute said ME instruction from said Instruction Memory to control operations of said Data Multiplexers, and to determine functions of said Arithmetic Logic Unit (ALU).

13. The host-fabric adapter as claimed in claim 12, wherein said Instruction Memory corresponds to a static random-access-memory (SRAM) provided to store microcode that are downloadable for providing said ME instruction to said Instruction Decoder.

14. The host-fabric adapter as claimed in claim 1, wherein said host interface, said serial interface and said Micro-Engine (ME) are configured in accordance with the "*Virtual Interface (VI) Architecture Specification*", the "*Next Generation Input/Output (NGIO) Specification*" and the "*InfiniBand™ Specification*".

15. A host-fabric adapter installed at a host system for connecting to a switched fabric of a data network, comprising:

a Micro-Engine (ME) arranged to establish connections and support data transfers via said switched fabric;

a serial interface arranged to receive and transmit data packets from said switched fabric for data transfers;

a host interface arranged to receive and transmit host data transfer requests, in the form of descriptors, from said host system for data transfers; and a first-in/first-out (FIFO) interface arranged to receive and transmit data packets to/from said switched fabric via said serial interface, and incorporated therein a Protection Index and Offset Hardware Assist (HWA) mechanism configured to process the Virtual Address (VA) and Memory Handle (MH) of data packets and generate therefrom a Protection Index (PI) and Offset so as to offload said Micro-Engine (ME) from having to process all data packets for data transfers.

16. The host-fabric adapter as claimed in claim 15, wherein said Protection Index and Offset Hardware Assist (HWA) mechanism comprises:

a packet Buffer arranged to temporarily store an incoming data packet from the serial interface;

a packet Loading Logic arranged to start loading the data packet from said packet Buffer in response to an ME instruction from said Micro-Engine (ME);

a Protection Index and Offset Logic arranged to calculate the Protection Index (PI) and Offset based on the Virtual Address (VA) and associated Memory Handle (MH) of the incoming data packet from the packet Buffer in accordance with a load Virtual Address (VA) request from said packet Loading Logic; and a Multiplexer arranged to select, as an output, the Protection Index (P1) and Offset needed for each task of said Micro-Engine (ME) in response to said ME instruction from said Micro-Engine (ME).

17. The host-fabric adapter as claimed in claim 16, wherein said packet Buffer is a single packet first-in/first-out (FIFO) storage device.

18. The host-fabric adapter as claimed in claim 16, wherein said Protection Index (P1) and Offset are obtained by said Protection Index and Offset Logic using the following formula:

$$\text{Offset}=VA (11:0); \text{ and}$$

$$\text{Protection Index (PI)}=VA (43:12)-MH (31:0),$$

where the Offset is the lower 12-bits of the Virtual Address (VA) of the incoming data packet to indicate which bytes within a single page are being addressed.

19. The host-fabric adapter as claimed in claim 16, wherein said Protection Index and Offset Logic comprises:

a plurality of task Virtual Address Registers arranged to receive the Virtual Address (VA) from the data packet and the load Virtual Address request in response to an ME instruction from said Micro-Engine (ME);

task Multiplexers arranged to obtain the Offset from the Virtual Address (VA) from the data packet previously registered in different Virtual Address Registers;

a Subtractor arranged to subtract the Memory Handle (MH) of the data packet input from the Virtual Address (VA) of the data packet;

a plurality of task Protection Index Registers arranged to load the result of the subtraction in accordance with the load Protection Index (P1) request and the ME instruction from said Micro-Engine (ME); and an output Multiplexer arranged to select between outputs of different task Protection Index Registers as the Protection Index (PI) in response to the ME instruction from said Micro-Engine (ME).

20. The host-fabric adapter as claimed in claim 16, wherein said Protection Index and Offset Logic comprises:
   a first Register arranged to receive the data packet and generate therefrom the Offset in accordance with the load Virtual Address request;
   a Subtractor arranged to subtract the Memory Handle (MH) from the Virtual Address (VA) of the data packet; and
   a second Register arranged to generate the Protection Index (PI) based on the result of the subtraction in accordance with the load Protection Index (PI) request.

21. The host-fabric adapter as claimed in claim 15, wherein said host interface includes a host interface Hardware Assist (HWA) mechanism configured to pre-process host descriptors for descriptor format errors in parallel with descriptor fetches so as to offload said Micro-Engine (ME) from having to check for said descriptor format errors.

22. The host-fabric adapter as claimed in claim 21, wherein said host interface Hardware Assist (HWA) mechanism comprises:
   a Descriptor Format Checker arranged to check host descriptors from said host system for said descriptor format errors using predetermined descriptor format rules and descriptor contents in response to a ME instruction from said Micro-Engine (ME); and
   a Descriptor Register Array arranged in parallel with said Descriptor Format Checker to supply descriptor status information to said Micro-Engine (ME) when descriptor fetching operations are completed.

23. The host-fabric adapter as claimed in claim 22, wherein said host descriptors from said host system provide information needed to complete send/receive, remote direct memory access (RDMA) write/read operations for data transfers, and include send/receive descriptors utilized to control transmission/reception of a single data packet, and remote direct memory access (RDMA) descriptors utilized to additionally indicate the address of remote information.

24. The host-fabric adapter as claimed in claim 15, further comprising:
   an address translation interface which provides an interface for address translation, and which is addressable by write data and system controls from said Micro-Engine (ME), via a system data bus and a system control bus;
   a context memory which provides an interface to a context manager, and which is addressable by write data and system controls from said Micro-Engine (ME), via said system data bus and said system control bus, for providing the necessary context for a work queue pair used for sending and receiving data packets;
   a local bus interface which provides an interface to a local bus, and which is addressable by write data and system controls from said Micro-Engine (ME), via said system data bus and said system control bus, for supporting system accessible context connections and data transfers; and
   a completion queue/doorbell manager interface which provides an interface to completion queues, and doorbell and memory registration rules, and which is addressable by write data and system controls from said Micro-Engine (ME), via said system data bus and said system control bus.

25. The host-fabric adapter as claimed in claim 24, wherein said Micro-Engine (ME) comprises:
   one or more Data Multiplexers arranged to supply appropriate interface data based on an ME instruction;
   an Instruction Memory arranged to provide said ME instruction based on downloadable microcode;
   an Arithmetic Logic Unit (ALU) arranged to perform mathematical, logical and shifting operations, and supply write data to the host interface, the address translation interface, the context memory interface, the local bus interface, the completion queue/doorbell manager interface, the Receive first-in/first out (FIFO) interface and the Transmit first-in/first out (FIFO) interface, via said system write data bus; and
   an Instruction Decoder arranged to supply system controls to the host interface, the address translation interface, the context memory interface, the local bus interface, the completion queue/doorbell manager interface, the Receive first-in/first out (FIFO) interface and the Transmit first-in/first out (FIFO) interface, via said system control bus, to execute said ME instruction from said Instruction Memory to control operations of said Data Multiplexers, and to determine functions of said Arithmetic Logic Unit (ALU).

26. The host-fabric adapter as claimed in claim 25, wherein said Instruction Memory corresponds to a static random-access-memory (SRAM) provided to store microcode that are downloadable for providing said ME instruction to said Instruction Decoder.

27. The host-fabric adapter as claimed in claim 15, wherein said host interface, said serial interface and said Micro-Engine (ME) are configured in accordance with the "*Virtual Interface (VI) Architecture Specification*", the "*Next Generation Input/Output (NGIO) Specification*" and the "*InfiniBand™ Specification*".

28. A host-fabric adapter, comprising:
   a Micro-Engine (ME) arranged to establish connections and support data transfers via a switched fabric;
   a host interface arranged to receive and transmit host data transfer requests, in the form of descriptors, from said host system for data transfers, and incorporated therein a host interface Hardware Assist (HWA) mechanism configured to pre-process host descriptors for descriptor format errors in parallel with descriptor fetches so as to offload said Micro-Engine (ME) from exclusively checking for said descriptor format errors;
   a serial interface arranged to receive and transmit data packets from said switched fabric for data transfers; and
   a first-in/first-out (FIFO) interface arranged to receive and transmit data packets to/from said switched fabric via said serial interface, and incorporated therein a Protection Index and Offset Hardware Assist (HWA) mechanism configured to process the Virtual Address (VA) and Memory Handle (MH) of data packets and generate therefrom a Protection Index (PI) and Offset so as to offload said Micro-Engine (ME) from exclusively processing data packets for data transfers.

29. The host-fabric adapter as claimed in claim 28, wherein said host interface Hardware Assist (HWA) mechanism comprises:
   a Descriptor Format Checker arranged to check host descriptors from said host system for said descriptor format errors using predetermined descriptor format rules and descriptor contents in response to a ME instruction from said Micro-Engine (ME); and a Descriptor Register Array arranged in parallel with said Descriptor Format Checker to supply descriptor status information to said Micro-Engine (ME) when descriptor fetching operations are completed.

30. The host-fabric adapter as claimed in claim 29, wherein said host descriptors from said host system provide information needed to complete send/receive, remote direct memory access (RDMA) write/read operations for data transfers, and include send/receive descriptors utilized to control transmission/reception of a single data packet, and remote direct memory access (RDMA) descriptors utilized to additionally indicate the address of remote information.

31. The host-fabric adapter as claimed in claim 28, wherein said Protection Index and Offset Hardware Assist (HWA) mechanism comprises:

a packet Buffer arranged to temporarily store an incoming data packet from the serial interface;

a packet Loading Logic arranged to start loading the data packet from said packet Buffer in response to an ME instruction from said Micro-Engine (ME);

a Protection Index and Offset Logic arranged to calculate the Protection Index (PI) and Offset based on the Virtual Address (VA) and associated Memory Handle (MH) of the incoming data packet from the packet Buffer in accordance with a load Virtual Address (VA) request from said packet Loading Logic; and a Multiplexer arranged to select, as an output, the Protection Index (PI) and Offset needed for each task of said Micro-Engine (ME) in response to said ME instruction from said Micro-Engine (ME).

32. The host-fabric adapter as claimed in claim 31, wherein said packet Buffer is a single packet first-in/first-out (FIFO) storage device.

33. The host-fabric adapter as claimed in claim 31, wherein said Protection Index (PI) and Offset are obtained by said Protection Index and Offset Logic using the following formula:

Offset VA (11:0); and

Protection Index (P1) = VA (43:12) - MH (31:0), where the Offset is the lower 12-bits of the Virtual Address (VA) of the incoming data packet to indicate which bytes within a single page are being addressed.

34. The host-fabric adapter as claimed in claim 31, wherein said Protection Index and Offset Logic comprises:

a plurality of task Virtual Address Registers arranged to receive the Virtual Address (VA) from the data packet and the load Virtual Address request in response to an ME instruction from said Micro-Engine (ME);

task Multiplexers arranged to obtain the Offset from the Virtual Address (VA) from the data packet previously registered in different Virtual Address Registers; P1 a Subtractor arranged to subtract the Memory Handle (MH) of the data packet input from the Virtual Address (VA) of the data packet;

a plurality of task Protection Index Registers arranged to load the result of the subtraction in accordance with the load Protection Index (PI) request and the ME instruction from said Micro-Engine (ME); and an output Multiplexer arranged to select between outputs of different task Protection Index Registers as the Protection Index (PI) in response to the ME instruction from said Micro-Engine (ME).

35. The host-fabric adapter as claimed in claim 31, wherein said Protection Index and Offset Logic comprises:

a first Register arranged to receive the data packet and generate therefrom the Offset in accordance with the load Virtual Address request;

a Subtractor arranged to subtract the Memory Handle (MH) from the Virtual Address (VA) of the data packet; and a second Register arranged to generate the Protection Index (PI) based on the result of the subtraction in accordance with the load Protection Index (PI) request.

36. The host-fabric adapter as claimed in claim 31, wherein said host interface, said serial interface, and said FIFO interface and said Micro-Engine (ME) are configured in accordance with the "*Virtual Interface (VI) Architecture Specification*", the "*Next Generation Input/Output (NGIO) Specification*" and the "*InfiniBand™ Specification*".

* * * * *

UNITED STATES PATENT AND TRADEMARK OFFICE
CERTIFICATE OF CORRECTION

PATENT NO. : 7,181,541 B1 Page 1 of 1
APPLICATION NO. : 09/672711
DATED : February 20, 2007
INVENTOR(S) : Burton et al.

It is certified that error appears in the above-identified patent and that said Letters Patent is hereby corrected as shown below:

In column 22, line 35, in Claim 16, delete "P1" and insert -- PI --, therefor.

In column 22, line 42, in Claim 18, delete "P1" and insert -- PI --, therefor.

In column 22, line 66, in Claim 19, delete "P1" and insert -- PI --, therefor.

In column 23, line 3, in Claim 19, delete "P1" and insert -- PI --, therefor.

In column 23, line 14, in Claim 20, delete "P1" and insert -- PI --, therefor.

In column 24, line 34, in Claim 27, delete "(NGJO)" and insert -- (NGIO) --, therefor.

In column 24, line 57, in Claim 28, delete "P1" and insert -- PI --, therefor.

In column 25, line 38, in Claim 33, after "offset" insert -- = --.

In column 25, line 40, in Claim 33, delete "P1" and insert -- PI --, therefor.

In column 26, line 10, in Claim 34, after "Registers;" delete "P1".

Signed and Sealed this

Twenty-sixth Day of February, 2008

JON W. DUDAS
*Director of the United States Patent and Trademark Office*